United States Patent
Clark

(10) Patent No.: US 8,538,250 B2
(45) Date of Patent: Sep. 17, 2013

(54) SYSTEMS AND METHODS FOR COMMUNICATING WITH A DEVICE USING ONE OR MORE CAMERA BODY CONTROLS

(71) Applicant: Lab Partners Associates, Inc., South Burlington, VT (US)

(72) Inventor: James E. Clark, South Burlington, VT (US)

(73) Assignee: Lab Partners Associates, Inc., South Burlington, VT (US)

( * ) Notice: Subject to any disclaimer, the term of this patent is extended or adjusted under 35 U.S.C. 154(b) by 0 days.

(21) Appl. No.: 13/692,550

(22) Filed: Dec. 3, 2012

(65) Prior Publication Data
US 2013/0094845 A1 Apr. 18, 2013

Related U.S. Application Data

(63) Continuation of application No. 12/705,096, filed on Feb. 12, 2010, now Pat. No. 8,326,136.

(60) Provisional application No. 61/151,881, filed on Feb. 12, 2009.

(51) Int. Cl.
G03B 15/06 (2006.01)
G03B 17/00 (2006.01)
G03B 15/03 (2006.01)

(52) U.S. Cl.
USPC ............ 396/56; 362/233; 396/4; 396/164; 396/297

(58) Field of Classification Search
USPC ............ 396/1–5, 56–58, 166, 175, 201, 280, 396/299, 301–303; 348/333.13; 362/233
See application file for complete search history.

(56) References Cited

U.S. PATENT DOCUMENTS 3,039,375 A 6/1962 Umbach
3,185,056 A 5/1965 Gold et al.
(Continued)

FOREIGN PATENT DOCUMENTS

CA 2616030 1/2013
CN 2007-80020420.4 6/2010
(Continued)

OTHER PUBLICATIONS

U.S. Appl. No. 12/705,052, Mar. 27, 2012, Office Action, 8,326,141.
(Continued)

*Primary Examiner* — Clayton E Laballe
*Assistant Examiner* — Leon W Rhodes, Jr.
(74) *Attorney, Agent, or Firm* — Downs Rachlin Martin PLLC

(57) ABSTRACT

A control system for communicating with a controlled device, such as a lighting device, a special effects device and an in-scene device, in a photographic image-acquisition setting using a camera body. The control system is configured to detect a preset pattern of actuation of one or more camera body controls by a user. In response to detecting of the preset pattern, the control system either communicates a power state change signal to the controlled device or causes the camera body to enter into a controlled device control mode that changes the functionality of one or more camera body controls from a camera body functionality to a controlled device control functionality, or both. Such a system can allow a photographer to control a controlled device while remaining at the camera body.

25 Claims, 13 Drawing Sheets

(56) References Cited

U.S. PATENT DOCUMENTS

| | | |
|---|---|---|
| 3,205,803 A | 9/1965 | Burgarella et al. |
| 3,259,042 A | 7/1966 | Kagan |
| RE26,627 E | 7/1969 | Burgarella et al. |
| 3,659,509 A | 5/1972 | Burgarella |
| 3,728,947 A | 4/1973 | Harnden et al. |
| 3,782,258 A | 1/1974 | Boekkooi et al. |
| 3,810,214 A | 5/1974 | Malone et al. |
| 4,047,191 A | 9/1977 | Coppa et al. |
| 4,194,818 A | 3/1980 | Matteson et al. |
| 4,201,434 A | 5/1980 | Tureck |
| 4,209,244 A | 6/1980 | Sahara et al. |
| 4,333,719 A | 6/1982 | Takami et al. |
| 4,344,680 A | 8/1982 | Ishida et al. |
| 4,351,594 A | 9/1982 | Ishida et al. |
| 4,355,309 A | 10/1982 | Hughey et al. |
| 4,482,895 A | 11/1984 | Weinberg |
| 4,509,845 A | 4/1985 | Mizokami |
| 4,571,049 A | 2/1986 | Tsunefuji et al. |
| 4,573,786 A | 3/1986 | Taniguchi et al. |
| 4,603,954 A | 8/1986 | Egawa et al. |
| 4,636,052 A | 1/1987 | Bowsher |
| 4,643,551 A | 2/1987 | Ohmori |
| 4,693,582 A | 9/1987 | Kawamura et al. |
| 4,740,804 A | 4/1988 | Shands |
| 4,816,850 A | 3/1989 | Phillipeaux et al. |
| 4,816,855 A | 3/1989 | Kitaura et al. |
| 4,884,094 A | 11/1989 | Kitaura et al. |
| 4,988,584 A | 1/1991 | Shaper |
| 5,016,037 A | 5/1991 | Taniguchi et al. |
| 5,159,375 A | 10/1992 | Taniguchi et al. |
| 5,283,610 A | 2/1994 | Sasaki |
| 5,299,012 A | 3/1994 | Tsuruta et al. |
| 5,359,375 A | 10/1994 | Clark |
| 5,384,611 A | 1/1995 | Tsuji et al. |
| 5,422,543 A | 6/1995 | Weinberg |
| 5,436,531 A | 7/1995 | Weinberg |
| 5,521,708 A | 5/1996 | Beretta |
| 5,640,623 A | 6/1997 | Sasaki |
| 5,692,223 A | 11/1997 | Ichikawa et al. |
| 5,708,833 A | 1/1998 | Kinney et al. |
| 5,721,971 A | 2/1998 | Sasaki |
| 5,734,934 A | 3/1998 | Horinishi et al. |
| 5,754,898 A | 5/1998 | Nakano |
| 5,848,306 A | 12/1998 | Shono |
| 6,006,039 A | 12/1999 | Steinberg et al. |
| 6,029,013 A | 2/2000 | Larkin et al. |
| 6,052,539 A | 4/2000 | Latorre |
| 6,088,542 A | 7/2000 | Yanai et al. |
| 6,127,940 A | 10/2000 | Weinberg |
| 6,167,199 A | 12/2000 | Fukui |
| 6,278,481 B1 | 8/2001 | Schmidt |
| 6,351,610 B1 | 2/2002 | Numako et al. |
| 6,353,711 B1 | 3/2002 | Numako et al. |
| 6,366,737 B1 | 4/2002 | Numako et al. |
| 6,400,907 B1 | 6/2002 | Izukawa |
| 6,404,987 B1 | 6/2002 | Fukui |
| 6,430,369 B2 | 8/2002 | Lee et al. |
| 6,453,154 B1 | 9/2002 | Haber et al. |
| 6,524,237 B1 | 2/2003 | McGowan |
| 6,618,557 B1 | 9/2003 | Ziemkowski |
| 6,625,399 B1 | 9/2003 | Davis |
| 6,683,654 B1 | 1/2004 | Haijima |
| 6,718,135 B2 | 4/2004 | Kawasaki et al. |
| 6,731,952 B2 | 5/2004 | Schaeffer et al. |
| 6,748,165 B2 | 6/2004 | Ogasawara |
| 6,778,764 B2 | 8/2004 | Barghini et al. |
| 6,798,986 B2 | 9/2004 | Hagiuda |
| 6,863,417 B2 * | 3/2005 | Hill ................. 362/233 |
| 6,941,067 B2 | 9/2005 | Muramatsu |
| 7,016,603 B2 | 3/2006 | Clark |
| 7,035,534 B2 | 4/2006 | Shih et al. |
| 7,133,607 B2 | 11/2006 | Clark |
| 7,136,709 B2 * | 11/2006 | Arling et al. ........... 700/65 |
| 7,184,658 B2 | 2/2007 | Squillace |
| 7,362,965 B2 | 4/2008 | Clark |
| 7,437,063 B2 | 10/2008 | Clark |
| 7,446,800 B2 | 11/2008 | Holmes |
| 7,463,304 B2 | 12/2008 | Murray |
| 7,684,692 B2 | 3/2010 | Kashiyama |
| 7,702,228 B2 | 4/2010 | Clark |
| 7,714,908 B2 | 5/2010 | Holmes |
| 7,764,875 B2 | 7/2010 | Clark |
| 7,775,575 B2 | 8/2010 | Clark |
| 7,783,188 B2 | 8/2010 | Clark |
| 7,834,894 B2 | 11/2010 | Swanson et al. |
| 7,877,005 B2 | 1/2011 | Okubo |
| 7,880,761 B2 | 2/2011 | Clark |
| 7,885,533 B2 | 2/2011 | Clark |
| 7,965,335 B2 | 6/2011 | Niblock |
| 7,969,504 B2 | 6/2011 | Matsuda et al. |
| 7,970,267 B1 | 6/2011 | Clark |
| 8,116,620 B2 | 2/2012 | King |
| 8,116,621 B2 | 2/2012 | King |
| 8,121,468 B2 | 2/2012 | Clark |
| 8,130,276 B2 | 3/2012 | Holmes |
| 8,134,576 B2 | 3/2012 | Swanson et al. |
| 8,180,210 B2 | 5/2012 | Clark |
| 8,326,136 B1 | 12/2012 | Clark |
| 8,326,140 B2 | 12/2012 | Clark |
| 8,326,141 B2 | 12/2012 | Clark |
| 8,331,776 B2 | 12/2012 | Clark |
| 8,351,774 B2 | 1/2013 | Clark |
| 2001/0042149 A1 | 11/2001 | Ito et al. |
| 2002/0009296 A1 | 1/2002 | Shaper et al. |
| 2002/0013161 A1 | 1/2002 | Schaeffer et al. |
| 2002/0067425 A1 | 6/2002 | Iverson |
| 2002/0067923 A1 | 6/2002 | Fujimura |
| 2003/0128272 A1 | 7/2003 | Clough et al. |
| 2003/0133018 A1 | 7/2003 | Ziemkowski |
| 2003/0193588 A1 | 10/2003 | Yuen et al. |
| 2004/0036774 A1 | 2/2004 | Nichols et al. |
| 2005/0006484 A1 | 1/2005 | Ito |
| 2005/0174434 A1 | 8/2005 | Chang et al. |
| 2006/0014563 A1 | 1/2006 | Cheng |
| 2006/0216009 A1 | 9/2006 | Kawamura |
| 2006/0275024 A1 | 12/2006 | McNary |
| 2006/0291016 A1 | 12/2006 | Ishigami et al. |
| 2008/0180531 A1 | 7/2008 | Sekiguchi |
| 2009/0102679 A1 * | 4/2009 | Schoettle ................. 340/815.4 |
| 2009/0129765 A1 | 5/2009 | King |
| 2009/0135262 A1 | 5/2009 | Ogasawara |
| 2009/0278479 A1 | 11/2009 | Platner et al. |
| 2009/0310012 A1 | 12/2009 | Ueda et al. |
| 2010/0122215 A1 * | 5/2010 | MacGregor ................. 715/834 |
| 2010/0158494 A1 | 6/2010 | King |
| 2010/0177212 A1 | 7/2010 | Holmes |
| 2010/0202767 A1 | 8/2010 | Shirakawa |
| 2010/0209089 A1 | 8/2010 | King |
| 2011/0001665 A1 | 1/2011 | King |
| 2011/0119409 A1 | 5/2011 | King |
| 2011/0128390 A1 | 6/2011 | Clark |
| 2011/0129207 A1 | 6/2011 | King et al. |
| 2011/0167008 A1 | 7/2011 | King |
| 2012/0099847 A1 | 4/2012 | Clark |
| 2012/0120281 A1 | 5/2012 | Swanson et al. |
| 2012/0127340 A1 | 5/2012 | Holmes |
| 2012/0127361 A1 | 5/2012 | Clark |
| 2012/0140088 A1 | 6/2012 | Clark |
| 2012/0181948 A1 | 7/2012 | Clark |
| 2012/0194699 A1 | 8/2012 | Kouno |
| 2012/0207459 A1 | 8/2012 | Clark |
| 2012/0207460 A1 | 8/2012 | Clark |
| 2012/0243859 A1 | 9/2012 | Clark |
| 2013/0089313 A1 | 4/2013 | Clark |
| 2013/0094845 A1 | 4/2013 | Clark |
| 2013/0100340 A1 | 4/2013 | Clark |

FOREIGN PATENT DOCUMENTS

| | | |
|---|---|---|
| CN | 2010-10600736.4 | 2/2012 |
| CN | 2010-10600736.4 | 12/2012 |
| EP | 0984320 A1 | 3/2000 |
| EP | 07760263.9 | 1/2011 |
| EP | 07760263.9 | 7/2011 |
| EP | 8756458.9 | 7/2011 |

| | | |
|---|---|---|
| EP | 11177995.5 | 12/2011 |
| EP | 11177995.5 | 7/2012 |
| EP | 10741797 | 8/2012 |
| EP | 11177995.5 | 8/2012 |
| EP | 11177997.1 | 12/2012 |
| JP | 56-143422 | 11/1981 |
| JP | 59-064821 A | 4/1984 |
| JP | 59-170822 | 9/1984 |
| JP | 63-018874 | 1/1988 |
| JP | 05-093948 | 4/1993 |
| JP | 2002-244193 A | 8/2002 |
| JP | 2002-318413 | 10/2002 |
| JP | 2003-172970 A | 6/2003 |
| JP | 2003-215672 A | 7/2003 |
| JP | 2003-325451 | 11/2003 |
| JP | 2004-072230 | 3/2004 |
| JP | 2006-149935 | 6/2006 |
| JP | 2007-067870 A | 3/2007 |
| JP | 2010-510491 | 8/2012 |
| KR | 10-0728117 | 6/2007 |
| WO | 9638925 A1 | 12/1996 |
| WO | PCT/US2003/037271 | 5/2004 |
| WO | 2004049057 A1 | 6/2004 |
| WO | 2007012041 A2 | 1/2007 |
| WO | 2007118201 A2 | 10/2007 |
| WO | PCT/US2007/066162 | 11/2007 |
| WO | PCT/US2006/028229 | 2/2008 |
| WO | PCT/US2008/065137 | 9/2008 |
| WO | PCT/US2008/065139 | 9/2008 |
| WO | 2008150902 A1 | 12/2008 |
| WO | 2008150904 A1 | 12/2008 |
| WO | PCT/US2010/024088 | 7/2010 |
| WO | 2010093914 A1 | 8/2010 |
| WO | 2010093927 A1 | 8/2010 |
| WO | 2010093994 A1 | 8/2010 |
| WO | PCT/US2010/024108 | 9/2010 |
| WO | PCT/US2010/024195 | 9/2010 |
| WO | PCT/US2011/044008 | 11/2011 |
| WO | 2012009537 A1 | 1/2012 |
| WO | PCT/US2012/025915 | 6/2012 |
| WO | 2012161772 A1 | 11/2012 |

OTHER PUBLICATIONS

U.S. Appl. No. 12/705,052, Jun. 27, 2012, Response to Office Action, 8,326,141.
U.S. Appl. No. 12/705,052, Sep. 5, 2012, Notice of Allowance, 8,326,141.
U.S. Appl. No. 12/705,096, Mar. 12, 2012, Office Action, 8,326,136.
U.S. Appl. No. 12/705,096, Jun. 12, 2012, Response to Office Action, 8,326,136.
U.S. Appl. No. 12/705,096, Aug. 8, 2012, Notice of Allowance, 8,326,136.
U.S. Appl. No. 12/705,164, Mar. 29, 2012, Office Action.
U.S. Appl. No. 12/705,164, Jun. 29, 2012, Response to Office Action.
U.S. Appl. No. 12/705,164, Sep. 7, 2012, Office Action.
U.S. Appl. No. 12/705,164, Nov. 29, 2012, RCE.
U.S. Appl. No. 13/692,515, filed Dec. 3, 2012.
U.S. Appl. No. 12/705,052, filed Feb. 12, 2010, 8,326,141.
U.S. Appl. No. 13/692,550, filed Dec. 3, 2012.
U.S. Appl. No. 12/705,096, filed Feb. 12, 2010, 8,326,136.
U.S. Appl. No. 12/705,164, filed Feb. 12, 2010.
Nikon D80 User's Manual; see "Modeling Flash," p. 98; published on Aug. 11, 2006.
U.S. Appl. No. 13/735,325, Mar. 15, 2013, Office Action.
U.S. Appl. No. 13/735,325, Mar. 21, 2013, Response to Office Action w/Terminal.
U.S. Appl. No. 13/708,326, Mar. 26, 2013, Notice of Allowance.
U.S. Appl. No. 13/208,706, Mar. 26, 2013, Response to Office Action.
U.S. Appl. No. 13/016,345, Apr. 26, 2013, Restriction Requirement.
U.S. Appl. No. 13/183,046, Apr. 29, 2013, Response to Office Action.
Affadavit of James E. Clark: FlashWizard II Synchronizer, signed Mar. 20, 2008; previously submitted in U.S. Appl. No. 11/697,241.
Analog Devices Technical Data Sheet for ADF7020-1 Transceiver IC, Analog Devices, Inc., 2005, pp. 1-44.

ASH Transceiver Impedance Matching; Document Created on Dec. 10, 2001; pp. 1 to 10; http://www.rfm.com/products/apnotes/antennamatch.pdf; last viewed on Dec. 15, 2005.
Canon EOS 40D Usuer's Manual; about Sep. 2007; Canon Corporation.
Declaration of James E. Clark filed on Feb. 18, 2005 in U.S. Appl. No. 10/306,759.
Ken Rockwell; How to Use Nikon Strobes Wirelessly, for Free!; Dec. 17, 2005; http://web.archive.org/web/20051217091704/http://www.kenrockwell.com/nikon/ittlslave.htm; last viewed at Internet archive on Apr. 1, 2010.
Nikon D2x; Sep. 2004; pp. 1 to 12; Nikon Corporation.
Nikon WT-1 Transmitter User's Manual; around Dec. 2003; Nikon Corporation.
Nikon WT-2 Article, Part 1; Nikon Corporation; http://nikonimaging.com/global/technology/scene/11/index.htm; last viewed on Mar. 14, 2008.
Nikon WT-2 Article, Part 2: Nikon Corporation; http://nikonimaging.com/global/technology/scene/11/index_02.htm; last viewed on Mar. 14, 2008.
Phil Askey, Nikon D2H Review: 15. Wireless: Digital Photography Review, Wireless (Review of WT-1 Transmitter); Dec. 2003; http://www.dpreview.com/reviews/NikonD2H/page15.asp; last viewed on Mar. 18, 2008.
Phil Askey, Nikon D2H Review: 1. Introduction: Digital Photography Review, Nikon D2H Review, Dec. 2003; http://www.dpreview.com/reviews/NikonD2H/; last viewed on Mar. 18, 2008.
Phil Askey, Nikon D2Hs Preview: 1. Introduction: Digital Photography Review (includes Review of WT-2 Transmitter); Feb. 2005; http://www.dpreview.com/articles/nikond2hs/; last viewed Mar. 14, 2008.
PocketWizard MultiMAX Transceiver New Trigger Control Software Features, by LPA Design, Feb. 10, 2001; pp. 1 to 6, United States.
PocketWizard MultiMAX Transceiver Owner's Manual, by LPA Design, May 2001, pp. 1-55 and "Relay Mode" on p. 40, United States.
Quantum FreeWire Transceiver; Jul. 17, 2005; pp. 1 to 7; http://web.archive.org/web/20050717015832/http://www.qtm.com/wireless/freewire.html; last viewed at Internet Archive on Apr. 25, 2008.
Quantum FreeWire Transceiver; Nov. 15, 2004; pp. 1 to 7; http://web.archive.org/web/20041115093657/http://www.qtm.com/wireless/freewire.html; last viewed at Internet Archive on Apr. 25, 2008.
Quantum FreeWire Transceiver; Oct. 7, 2001; pp. 1 to 6; http://web.archive.org/web/20011007140624/http://www.qtm.com/wireless/freewire.html; last viewed at Internet Archive on Apr. 25, 2008.
Rob Galbraith; Casting Light on the PocketWizard MiniTT1 and FlexTT5; Parts 1 to 5; Feb. 16, 2009; http://www.robgalbraith.com/bins/multi_page.asp?cid=7-9884-9903; last viewed on Jul. 12, 2012.
Robert Hanashiro; Equipment Corner—News & Notes for all Those Gear-Heads; Nov. 26, 2001; pp. 1 to 3; http://www.sportsshooter.com/news_story.html?id=594; last viewed on Sep. 17, 2002.
Strobist Blog: PocketWizard FlexTT5 and MiniTT1: Full Review; Feb. 16 to 18, 2009; blog comments, pp. 1 to 40; http://strobist.blogspot.com/2009/02/pocketwizard-flextt5-and-minitt1-full.html; last viewed on Feb. 18, 2009.
Strobist Blog: PocketWizard FlexTT5 and MiniTT1: Full Review; Feb. 16, 2009; pp. 1 to 11; http://strobist.blogspot.com/2009/02/pocketwizard-flextt5-and-minitt1-full.html; last viewed on Feb. 18, 2009.
XE-200 RF Shutter Release for Rebel 2000; http://zenopuseelectronix.com/XE-200.html; last viewed on Sep. 9, 2002.
U.S. Appl. No. 11/305,668, Mar. 8, 2006, Office Action, 7,133,607.
U.S. Appl. No. 11/305,668, Jun. 8, 2006, Response to Office Action, 7,133,607.
U.S. Appl. No. 11/305,668, Jun. 13, 2006, Supplemental Response to Request for Clarification by the Examiner, 7,133,607.
U.S. Appl. No. 11/305,668, Jun. 30, 2006, Notice of Allowance, 7,133,607.
U.S. Appl. No. 11/305,668, Mar. 29, 2007, Request for Correction of Letters, 7,133,607.
U.S. Appl. No. 11/529,203, Aug. 14, 2007, Office Action, 7,362,965.

U.S. Appl. No. 11/529,203, Oct. 16, 2007, Terminal Disclaimer, 7,362,965.
U.S. Appl. No. 11/529,203, Oct. 16, 2007, Response to Office Action, 7,362,965.
U.S. Appl. No. 11/529,203, Oct. 25, 2007, Terminal Disclaimer, 7,362,965.
U.S. Appl. No. 11/529,203, Dec. 14, 2007, Notice of Allowance, 7,362,965.
U.S. Appl. No. 12/104,950, Dec. 31, 2009, Office Action, 7,764,875.
U.S. Appl. No. 12/104,950, Feb. 1, 2010, Response to Office Action, 7,764,875.
U.S. Appl. No. 12/104,950, Mar. 23, 2010, Notice of Allowance, 7,764,875.
U.S. Appl. No. 12/843,254, Jul. 27, 2010, Preliminary Remarks, 8,121,468.
U.S. Appl. No. 12/843,254, Aug. 25, 2011, Office Action, 8,121,468.
U.S. Appl. No. 12/843,254, Aug. 25, 2011, Response to Office Action, 8,121,468.
U.S. Appl. No. 12/843,254, Aug. 25, 2011, Terminal Disclaimer, 8,121,468.
U.S. Appl. No. 12/843,254, Nov. 28, 2011, Notice of Allowance, 8,121,468.
U.S. Appl. No. 13/399,333, Jun. 14, 2012, Office Action, 8,351,774.
U.S. Appl. No. 13/399,333, Sep. 14, 2012, Response to Office Action, 8,351,774.
U.S. Appl. No. 13/399,333, Sep. 14, 2012, Terminal Disclaimers, 8,351,774.
U.S. Appl. No. 13/399,333, Sep. 28, 2012, Notice of Allowance, 8,351,774.
U.S. Appl. No. 10/306,759, Aug. 29, 2003, Office Action, 7,016,603.
U.S. Appl. No. 10/306,759, Dec. 18, 2003, Response to Office Action, 7,016,603.
U.S. Appl. No. 10/306,759, Dec. 24, 2003, Examiner Interview Summary, 7,016,603.
U.S. Appl. No. 10/306,759, Mar. 27, 2004, Final Office Action, 7,016,603.
U.S. Appl. No. 10/306,759, Apr. 15, 2004, Examiner Interview Summary, 7,016,603.
U.S. Appl. No. 10/306,759, Apr. 20, 2004, Response to Final Office Action, 7,016,603.
U.S. Appl. No. 10/306,759, Aug. 24, 2004, Office Action, 7,016,603.
U.S. Appl. No. 10/306,759, Feb. 18, 2005, Request for Continued Examination, 7,016,603.
U.S. Appl. No. 10/306,759, Mar. 29, 2005, Office Action, 7,016,603.
U.S. Appl. No. 10/306,759, Apr. 14, 2005, Response to Office Action, 7,016,603.
U.S. Appl. No. 10/306,759, Jun. 29, 2005, Final Office Action, 7,016,603.
U.S. Appl. No. 10/306,759, Aug. 25, 2005, Response to Final Office Action, 7,016,603.
U.S. Appl. No. 10/306,759, Sep. 16, 2005, Notice of Allowance, 7,016,603.
U.S. Appl. No. 10/306,759, Oct. 18, 2005, 312 Amendment, 7,016,603.
U.S. Appl. No. 10/306,759, Dec. 20, 2005, Response to 312 Amendment, 7,016,603.
U.S. Appl. No. 10/306,759, Jan. 4, 2006, Response to 312 Amendment, 7,016,603.
U.S. Appl. No. 10/306,759, Nov. 18, 2006, Certificate of Correction, 7,016,603.
U.S. Appl. No. 11/488/491, Oct. 16, 2007, Office Action.
U.S. Appl. No. 11/490,322, Apr. 20, 2010, Office Action, 7,880,761.
U.S. Appl. No. 11/490,322, Jul. 12, 2010, Response to Office Action, 7,880,761.
U.S. Appl. No. 11/490,322, Sep. 15, 2010, Notice of Allowance, 7,880,761.
U.S. Appl. No. 12/250,914, Jun. 12, 2009, Office Action, 7,702,228.
U.S. Appl. No. 12/250,914, Jun. 29, 2009, Response to Office Action and Terminal Disclaimer, 7,702,228.
U.S. Appl. No. 12/250,914, Oct. 28, 2009, Terminal Disclaimer, 7,702,228.
U.S. Appl. No. 12/250,914, Dec. 3, 2009, Notice of Allowance, 7,702,228.
U.S. Appl. No. 12/762,811, Dec. 28, 2010, Office Action, 7,970,267.
U.S. Appl. No. 12/762,811, Mar. 28, 2011, Response to Office Action, 7,970,267.
U.S. Appl. No. 12/762,811, Mar. 28, 2011, Terminal Disclaimer, 7,970,267.
U.S. Appl. No. 12/762,811, Apr. 20, 2011, Notice of Allowance, 7,970,267.
U.S. Appl. No. 13/169,413, Dec. 20, 2011, Office Action, 8,180,210.
U.S. Appl. No. 13/169,413, Jan. 16, 2012, Response to Office Action, 8,180,210.
U.S. Appl. No. 13/169,413, Jan. 16, 2012, Terminal Disclaimers, 8,180,210.
U.S. Appl. No. 13/169,413, Mar. 22, 2012, Notice of Allowance, 8,180,210.
U.S. Appl. No. 13/438,500, Jun. 18, 2012, Office Action.
U.S. Appl. No. 13/438,500, Sep. 14, 2012, Response to Office Action.
U.S. Appl. No. 13/438,500, Sep. 14, 2012, Terminal Disclaimers.
U.S. Appl. No. 11/697,241, Nov. 8, 2007, Office Action, 7,437,063.
U.S. Appl. No. 11/697,241, Mar. 10, 2008, Response to Office Action, 7,437,063.
U.S. Appl. No. 11/697,241, Mar. 24, 2008, Examiner Interview Summary, 7,437,063.
U.S. Appl. No. 11/697,241, Jun. 9, 2008, Notice of Allowance, 7,437,063.
U.S. Appl. No. 12/129,447, Apr. 12, 2010, Notice of Allowance, 7,775,575.
U.S. Appl. No. 12/129,447, Apr. 12, 2010, Examiner Amendment, 7,775,575.
U.S. Appl. No. 12/861,445, Sep. 30, 2010, Notice of Allowance, 7,885,533.
U.S. Appl. No. 13/021,951, Nov. 25, 2011, Notice of Allowance, 8,331,776.
U.S. Appl. No. 13/021,951, Feb. 13, 2012, Withdrawal of Notice of Allowance, 8,331,776.
U.S. Appl. No. 13/021,951, Feb. 22, 2012, Office Action, 8,331,776.
U.S. Appl. No. 13/253,596, Nov. 30, 2011, Office Action, 8,326,140.
U.S. Appl. No. 13/253,596, Feb. 29, 2012, Response to Office Action, 8,326,140.
U.S. Appl. No. 13/253,596, May 9, 2012, Final Office Action, 8,326,140.
U.S. Appl. No. 12/129,402, Apr. 19, 2010, Notice of Allowance, 7,783,188.
U.S. Appl. No. 13/208,686, Feb. 6, 2013, Office Action.
U.S. Appl. No. 13/208,706, Dec. 26, 2012, Office Action.
U.S. Appl. No. 13/183,046, Feb. 13, 2013, Office Action.
U.S. Appl. No. 13/735,325, filed Jan. 7, 2013.
U.S. Appl. No. 13/016,345, filed Jan. 28, 2011.
U.S. Appl. No. 13/438,500, filed Apr. 3, 2012.
U.S. Appl. No. 13/708,326, filed Dec. 7, 2012.
U.S. Appl. No. 13/201,182, filed Aug. 11, 2011.
U.S. Appl. No. 13/201,185, filed Aug. 11, 2011.
U.S. Appl. No. 13/208,686, filed Aug. 12, 2011.
U.S. Appl. No. 13/208,706, filed Aug. 12, 2011.
U.S. Appl. No. 13/201,281, filed Aug. 12, 2011.
U.S. Appl. No. 13/401,175, filed Feb. 21, 2012.
U.S. Appl. No. 13/183,046, filed Jul. 14, 2011.

* cited by examiner

SYSTEMS AND METHODS FOR COMMUNICATING WITH A DEVICE USING ONE OR MORE CAMERA BODY CONTROLS

RELATED APPLICATION DATA

This application is a continuation of U.S. application Ser. No. 12/705,096, filed Feb. 12, 2010, and titled "Systems and Methods For Communicating With a Device Using One or More Camera Body Controls," which application claims the benefit of priority of U.S. Provisional Patent Application No. 61/151,881, filed on Feb. 12, 2009, and titled "Systems And Methods For Communicating With A Device Using One Or More Camera Body Controls." Each of these applications is incorporated by reference herein in its entirety.

FIELD OF THE INVENTION

The present invention generally relates to the field of photography. In particular, the present invention is directed to systems and methods for communicating with a device using one or more camera body controls.

BACKGROUND

Photography is an integral component of modern society, and photographs pervade our lives. Photographic images appear, for example, in books, magazines, catalogs, journals, newspapers, billboards, posters and scrapbooks and are displayed in homes, art galleries, retail stores, shopping malls, office buildings and many other places. While many photographic images are acquired using only natural ambient light, many other images are acquired using photographic flash lighting. When image-acquisition flash lighting is used, a photographer often uses one or more modeling lights prior to image acquisition for any of a variety of reasons, such as checking for unwanted shadows, glare, reflection, etc. and/or checking for desired shadows and other lighting effects. Generally, these modeling lights are either kept powered up to a sufficient level or turned up to a sufficient level when needed. Keeping the modeling lighting powered up can be problematic due to the heat this type of lighting generates, which can be uncomfortable for live models and detrimental to heat-sensitive still subjects. Occasionally turning up the power of modeling lighting can be inconvenient, even using more recent remotely-controlled modeling lights.

Many photographic images are acquired without adding special effects to the captured scene. However, many other photographic images are acquired using added special effects, such as artificial wind, snow, mist and rain, and/or using contrived scenes that use in-scene props and other items, such as in-scene lighting. Today, many special effects generators, for example, fans, snow shakers, misters and rain systems, are turned off and on electronically using dedicated on/off and/or speed/power control switches. Similarly, in-scene lighting can often be controlled using such dedicated control switches. Typically, a photographer, or more often a photographer's assistant, has the task of controlling the operation of any special effects devices and in-scene lighting for image acquisition.

In addition, some photographic settings, such as very low-light scenes photographed in a photography studio (or other location having controllable ambient lighting), require ambient lighting to be lowered or turned off during image acquisition so that the ambient light does not interfere with image acquisition. Often, this ambient lighting needs to remain on except for short periods at and around the time of image acquisition because the ambient lighting is necessary for the photographer and any assistants to see while moving around the studio and/or readying the scene for image acquisition. Usually, a photographer or photographer's assistant manually controls the pertinent ambient lighting device(s) using conventional dedicated controls.

SUMMARY OF THE DISCLOSURE

In one implementation, the present disclosure includes a method of communicating with a remote lighting device using a camera body, including detecting a first preset pattern of actuation by a user of at least one first camera body control on the camera body; generating a first power level signal in response to said detecting of the first preset pattern of actuation; wirelessly communicating the first power level signal to the remote lighting device so as to cause the remote lighting device to operate at a first power level; after communicating the first power level signal, detecting a second preset pattern of actuation by a user of at least one second camera body control on the camera body; generating a second power level signal in response to said detecting of the second preset pattern of actuation; and wirelessly communicating the second power level signal to the remote lighting device so as to cause the remote lighting device to operate at a second power level.

In another implementation, the present disclosure includes a system for communicating with a remote lighting device using a camera body, including a means for detecting a first preset pattern of actuation by a user of at least one first camera body control on the camera body; a means for generating a first power level signal in response to said detecting of the first preset pattern of actuation; a means for wirelessly communicating the first power level signal to the remote lighting device so as to cause the remote lighting device to operate at a first power level; a means for after communicating the first power level signal, detecting a second preset pattern of actuation by a user of at least one second camera body control on the camera body; a means for generating a second power level signal in response to said detecting of the second preset pattern of actuation; and a means for wirelessly communicating the second power level signal to the remote lighting device so as to cause the remote lighting device to operate at a second power level.

In still another implementation, the present disclosure includes a machine-readable hardware storage medium containing machine-executable instructions for performing a method of communicating with a controlled device using a camera body, said machine-executable instructions including a set of instructions for detecting a first preset pattern of actuation by a user of at least one first camera body control on the camera body; a set of instructions for generating a first power level signal in response to said detecting of the first preset pattern of actuation; a set of instructions for wirelessly communicating the first power level signal to the remote lighting device so as to cause the remote lighting device to operate at a first power level; a set of instructions for after communicating the first power level signal, detecting a second preset pattern of actuation by a user of at least one second camera body control on the camera body; a set of instructions for generating a second power level signal in response to said detecting of the second preset pattern of actuation; and a set of instructions for wirelessly communicating the second power level signal to the remote lighting device so as to cause the remote lighting device to operate at a second power level.

BRIEF DESCRIPTION OF THE DRAWINGS

For the purpose of illustrating the invention, the drawings show aspects of one or more embodiments of the invention.

However, it should be understood that the present invention is not limited to the precise arrangements and instrumentalities shown in the drawings, wherein.

DETAILED DESCRIPTION

Figure 1A:
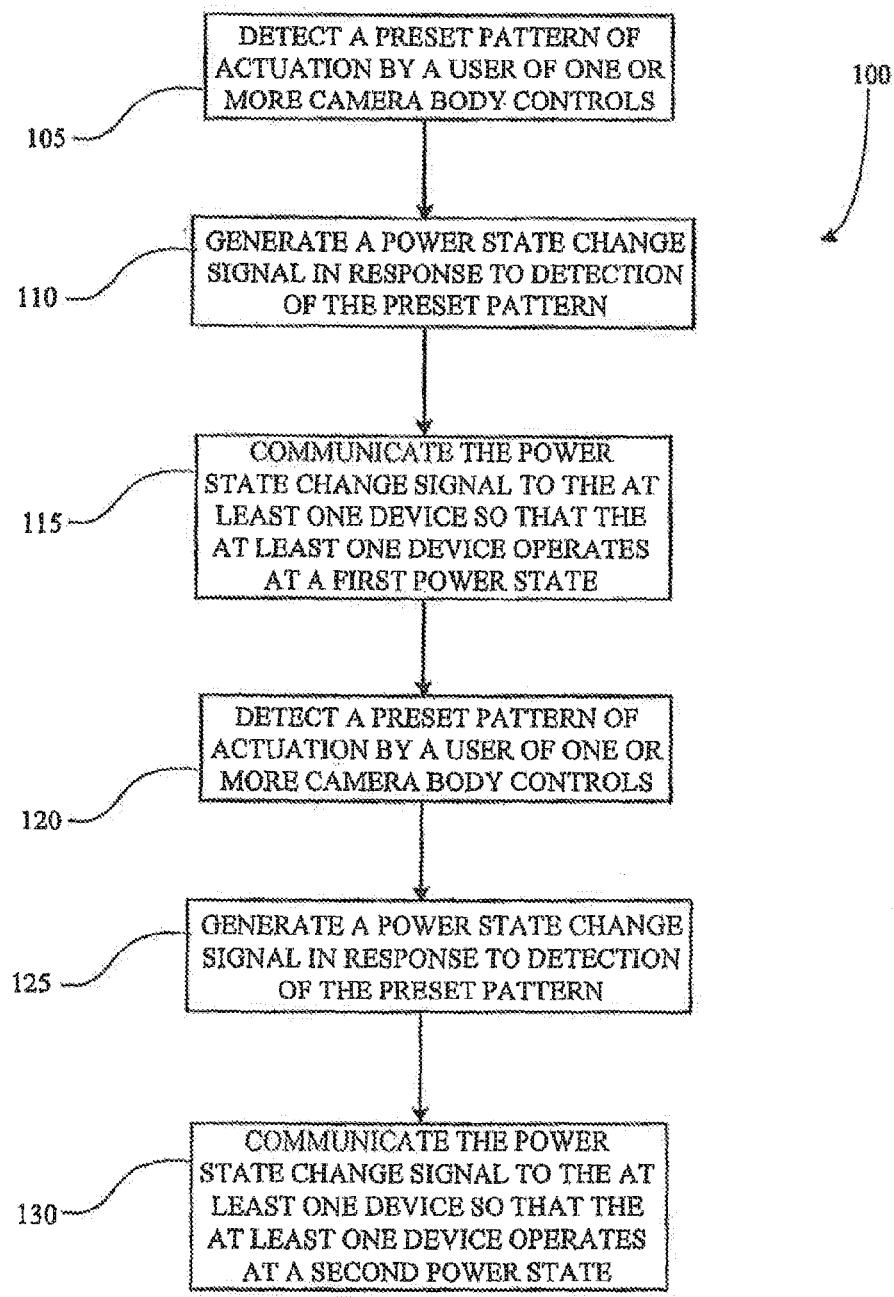
FIG. 1A is a flow diagram illustrating a method of communicating with a device using one or more camera body controls.

Referring now to the drawings, FIG. 1A illustrates a method 100 of communicating with a remote device using one or more camera body controls. As will be readily understood by those skilled in the art after reading this entire disclosure, a communication method containing broad concepts disclosed herein, such as method 100, is useful for a number of purposes, including: allowing a photographer to use modeling lighting to check for unwanted and/or wanted lighting effects and levels that will appear in images captured using flash photography; allowing a photographer to control operation of remote special effects; allowing a photographer to control ambient and in-scene lighting; allowing a photographer to control remotely controllable devices appearing in a photographic scene; and any combination thereof, all without having to remove an eye from the camera's viewfinder or live-view display.

Method 100 typically begins at step 105 by detecting whether or not a user has actuated one or more camera body controls of a camera body in a preset pattern setup to correspond to the user's desire to control one or more controllable devices located remote from the camera body. As used herein and in the appended claims, the term "pattern" is intended to cover multiple actuations of one or more camera body controls, such as three rapid partial presses of a shutter-release button, as well as the simultaneous and/or sequential actuation of two or more controls, such as actuating a backlighting control button while holding down a menu on/off switch, among many other possibilities. In addition, it is noted that as used herein and in the appended claims the term "camera body control" and like terms mean a control that causes a signal to be generated either internally or externally relative to the camera body and that is used to control functionality inherent in the camera body itself, any lens attached thereto and any image-acquisition flash-lighting device attached to the camera body or responsive to a flash-sync signal generated by the camera body. Because the present disclosure is directed to controlling devices starting prior to any image capturing, a shutter-release signal is excluded from being a relevant camera body signal. As those skilled in the art will appreciate, the term "shutter" as used herein and in the appended claims is intended to refer to a mechanical shutter, an electronic shutter and any combination thereof and equivalent thereto.

A camera body signal can be generated by a user actuating any type of switch or other actuator, mechanical, soft or otherwise. A camera body signal can also be generated by circuitry internal to a camera body in response to any one or more of a variety of events, such as a user actuating a switch (e.g., a partial press (a/k/a "half press") of a shutter release button or a press of an autofocus button or a depth-of-field preview button or the actuation of a camera-body mode dial) and camera body circuitry determining a particular function is needed (e.g., a camera processor determining that the lens needs to be autofocused), among others. Examples of a camera body signal generated internally within the camera body include, but are not limited to, a camera body wake signal, a camera body sleep signal, an autofocus assist signal, a camera body backlighting on/off signal, a menu control signal, a flash compensation signal, a signal from a "click wheel" or other user control, such as a partial-press switch signal generated upon a partial press of a shutter-release button. Examples of a camera body signal generated externally include, but are not limited to, a partial-press switch signal initiated from an external device and communicated to the camera body, for example, via an external communications port on the camera body (e.g., a hotshoe, a proprietary connector port, a motor-drive port, a universal serial bus (USB) port, a "FIREWIRE" (IEEE 1394) port, etc.) and any other camera body signal that can be initiated or generated externally from the camera body. Specific examples are described below in detail to give the reader an understanding of how step 105 can be implemented.

However, those skilled in the art will appreciate that controls provided to a particular camera body and camera body control signals vary to a great extent such that it is impractical to cover all current conventional camera body controls and camera body control signals, and that it is virtually impossible to predict future camera body controls and camera body control signals. That said, those skilled in the art will readily be able to implement the broad concepts of the present disclosure for virtually any one or more camera body controls and/or any one or more camera body signals. The detection of the one or more camera body signals can be performed internally or externally relative to the camera body, for example, by a controller, such as a microprocessor/software systems, hardware controller, a combination of these, or other circuitry. Several examples of internal and external detection are described below in detail.

At step 110 a power state change signal for controlling one or more remote devices is generated in response to the detection of the preset camera body control actuation pattern in step 105. Like detecting step 105, generating step 110 can be performed internally or externally relative to the camera body, depending on the configuration of the overall system. For example, if a particular camera body includes an internal controller, generating step 110 can be performed internally. In another example in which a controller is provided externally to a camera body, generation step 110 is performed outside the camera body. As will become apparent from the detailed examples provided below, the first power state change signal can be, for example, a signal recognizable directly by the target, i.e., controlled, device(s) or recognizable by an intermediate device, such as a wireless receiving device that, in turn, generates one or more signals recognizable by the controlled device(s). The relevant signaling depends on the overall configuration of the system. As will also be discussed below, the first power state change signal may be accompanied by and/or contain data, such as one or more power level values and/or a power state change time delay value for a subsequent power change, among others. Examples of such data are described below in the detailed examples.

At step 115 the first power state change signal is communicated to the at least one controlled device so as to cause device(s) to operate at a first power state corresponding to the power state change signal. As alluded to above relative to generating step 110, the way the controlled device(s) are caused to operate at the first power state depends on the configuration of the overall control system. For example, if a particular controlled device has user-settable power levels settings that can be input wirelessly, then the system can be configured, for example, so that the power state change signal contains a desired power level setting. In another example, if a particular controlled device has user-settable power level settings that can be input only either through an onboard user interface on the device or through a wired port on the device, then the system may include two wireless devices, a first one at the camera body and a second one connected to the wired input port of the controlled device. In one scenario, the first wireless device at the camera body may transmit a simple remote-device trigger signal to the second wireless device at the controlled device. In this case, upon receiving the trigger signal the second wireless device would, for example, send the illumination output level setting. If multiple controlled devices are being controlled at the same time via wireless devices, each of these devices may have a unique identifier that a properly configured system can utilize to implement differing control schemes among the multiple devices. Detailed examples of ways of implementing transmitting step 115 are presented below.

At step 120 it is determined whether or not a user has performed a preset pattern of camera body control actuation. This preset pattern may be the same as the preset pattern described above relative to step 105, or it may be different, depending on the desire of the designer. Like step 105, the preset pattern can be detected from camera body signals generated internally or externally relative to the camera body. At step 125 a power state change signal for controlling the one or more remote devices is generated in response to the detection of the preset camera body control actuation pattern in step 120. Like generating step 110, generating step 125 can be performed internally or externally relative to the camera body, depending on the configuration of the overall system. At step 130 the first power state change signal is communicated to the at least one controlled device so as to cause device(s) to change to a second power state corresponding to the power state change signal generated at step 125. The implementation of step 130 may be, for example, the same as the implementation of step 115 described above. Details of method 100 are described in more detail below, especially in connection with FIG. 9.

Figure 1B:
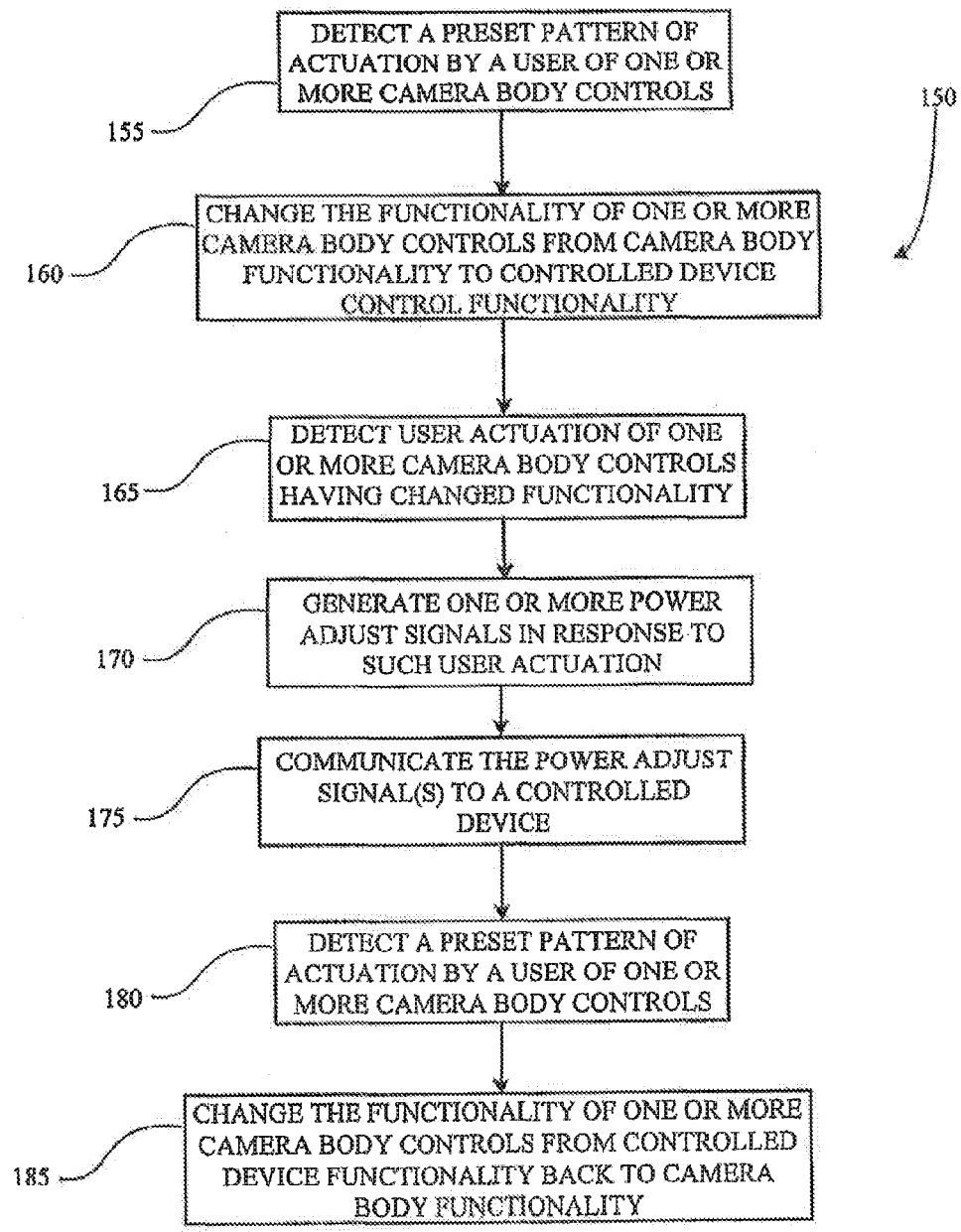
FIG. 1B is a flow diagram illustrating another method of communicating with a device using one or more camera body controls.

FIG. 1B illustrates another method, method 150, of communicating with a remote device using one or more camera body controls. As with method 100 of FIG. 1A, method 150 of FIG. 1B is useful for a number of purposes, including: allowing a photographer to use modeling lighting to check for unwanted and/or wanted lighting effects and levels that will appear in images captured using flash photography; allowing a photographer to control operation of remote special effects; allowing a photographer to control ambient and in-scene lighting; allowing a photographer to control remotely controllable devices appearing in a photographic scene; and any combination thereof, all without having to remove an eye from the camera's viewfinder or live-view display.

Method 150 typically begins at step 155 by detecting whether or not a user has actuated one or more camera body controls of a camera body in a first preset pattern setup to correspond to the user's desire to control one or more controllable devices located remote from the camera body. Again, the term "pattern" is intended to cover multiple actuations of one or more camera body controls, such as three rapid partial presses of a shutter-release button, as well as the simultaneous and/or sequential actuation of two or more controls, such as actuating a backlighting control button while holding down a menu on/off switch, among many other possibilities. In addition, it is noted that as used herein and in the appended claims the term "camera body control" and like terms mean a control that causes a signal to be generated either internally or externally relative to the camera body and that is used to control functionality inherent in the camera body itself, any lens attached thereto and any image-acquisition flash-lighting device attached to the camera body or responsive to a sync signal generated by the camera body. Because the present disclosure is directed to controlling devices starting prior to any image capturing, a shutter sync signal and related signals for triggering/controlling strobe lighting devices for image-acquisition lighting are excluded from being a relevant camera body signal. As those skilled in the art will appreciate, the term "shutter" as used herein and in the appended claims is intended to refer to a mechanical shutter, an electronic shutter and any equivalent thereto.

A camera body signal can be generated by a user actuating any type of switch or other actuator, mechanical, soft or otherwise. A camera body signal can also be generated by circuitry internal to a camera body in response to any one or more of a variety of events, such as a user actuating a switch (e.g., a partial press (a/k/a "half press") of a shutter release button or a press of an autofocus button or a depth-of-field preview button or the actuation of a camera-body mode dial) and camera body circuitry determining a particular function is needed (e.g., a camera processor determining that the lens needs to be autofocused), among others. Examples of a camera body signal generated internally within the camera body include, but are not limited to, a camera body wake signal, a camera body sleep signal, an autofocus assist signal, a camera body backlighting on/off signal, a menu control signal, a flash compensation signal, a signal from a "click wheel" or other user control, such as a partial-press switch signal generated upon a partial press of a shutter-release button. Examples of a camera body signal generated externally include, but are not limited to, a partial-press switch signal initiated from an external device and communicated to the camera body, for example, via an external communications port on the camera body (e.g., hotshoe, a proprietary connector port, a USB port, a "FIREWIRE" (IEEE 1394) port, etc.) and any other camera body signal that can be initiated or generated externally from the camera body. Specific examples are described below in detail to give the reader an understanding of how step 105 can be implemented.

However, those skilled in the art will appreciate that controls provided to a particular camera body and camera body control signals vary to a great extent such that it is impractical to cover all current conventional camera body controls and camera body control signals, and that it is virtually impossible to predict future camera body controls and camera body control signals. That said, those skilled in the art will readily be able to implement the broad concepts of the present disclosure for virtually any one or more camera body controls and/or any one or more camera body signals. The detection of the one or more camera body signals can be performed internally or externally relative to the camera body, for example, by a controller, such as a microprocessor/software systems, hardware controller, a combination of these, or other circuitry. Several examples of internal and external detection are described below in detail.

At step 160 and in response to the detection of the preset pattern at step 155, the functionality of one or more camera body controls is changed from camera body functionality to "controlled device control" functionality. At this point, the camera body can be said to enter into a controlled device mode, as distinct from a camera body control mode in which the camera body control(s) at issue has/have only camera body control functionality, and not any functionality relating to controlling a controlled device. As an example, a scroll wheel on the camera body that is "normally" used to control camera body functionality, such as setting a flash compensation value, can be used as a power state control that controls the power output level, for example, an illumination output level of a controlled lighting device, a motor speed of a controlled device having such a motor (such as a special effects fan).

To provide this control mode functionality, when method 150 has changed the functionality of one or more camera body controls, method 150 proceeds to step 165 at which it detects whether or not a user of the camera body has actuated the one or more camera body controls the functionality of which was changed in step 160. Again, as a simple example in which a scroll wheel normally used for setting a flash compensation value has been changed at step 160 to have controlled device control functionality, step 165 detects whether or not a user has rotated the scroll wheel. As those skilled in the art will readily appreciate, the manner in which this detection will vary with the control(s) involved. In the example of the scroll wheel, a microprocessor aboard the camera body may, for example, monitor an electrical signal from a rotational position transducer as it may when monitoring for rotational position changes of the scroll wheel in a flash compensation context. Alternatively, other signals relating to the rotational position of the scroll wheel can be used, such as an output of the microprocessor based on the transducer signal mentioned above. Those skilled in the art will readily understand that other manners of detection are possible and that it is impractical, and unnecessary, to describe all such possibilities. It is noted, too, that circuitry external to the camera body at issue could be used to perform the various detection (and/or other) steps of method 150 if the relevant signal(s) are made available outside of the camera body, such as via one or more ports on the camera body.

In response to the detection of user actuation at step 165, method 150 may proceed to step 170 at which one or more power adjusting signals are generated. For example, if the camera body control(s) having changed functionality provide a simple on/off functionality, only one power adjust signal may be generated at step 170. In other cases, such as with a continuous rotation of the scroll wheel in the scroll wheel example, more than one power adjust signals can be generated. In a particular embodiment of a scroll wheel, a continuous rotating of the scroll wheel by a user may cause a continual generation of incremental power adjust signals that function to cause the controlled device to incrementally adjust in its power state. For example, if the controlled device is a continuous light lighting source having variable illumination output, a rotating of the scroll wheel in one direction will cause the lighting source to gradually brighten, and a rotating of the scroll when in the opposite direction will cause the lighting source to gradually dim. In the context of a controlled device having a variable speed motor, the same rotations of the scroll wheel will cause the motor to, respectively, gradually speed up and slow down. In concert with the generation of one or more power adjust signals at step 170, at step 175 the power adjust signal(s) are communicated to the controlled device at issue. This communication may be via any suitable wired or wireless communication mode.

At step 180, it is determined whether or not the user has actuated one or more camera body controls in a second preset pattern (which may be the same as or different from the first preset pattern at step 155). If so, this is a signal that the functionality of the one or more camera body controls that changed functionality from camera body functionality to controlled device control functionality at step 160 are to be returned to "normal" camera body functionality. This occurs at step 185. It is noted that the steps of method 150 may not necessarily all be performed every time. For example, a user can implement the first preset pattern that is detected at step 155, but decide not to make any adjustments and promptly proceed to implementing the second preset pattern, which is detected at step 180. In this example, steps 165, 170, 175 are not performed. It is also noted that it is possible to integrate other steps within method 150. For example, method 100 of FIG. 1A and method 150 of FIG. 1B can be integrated with one another so that not only does the detection of the first and second preset patterns of camera body control actuation (FIG. 1B, steps 155, 180) result in the mode of the camera body being changed, but such detection also causes the generation corresponding respective power state change signals (see steps 110, 125 of FIG. 1A). Further details of this particular example are described below, for example, in connection with FIG. 9.

Figure 2:
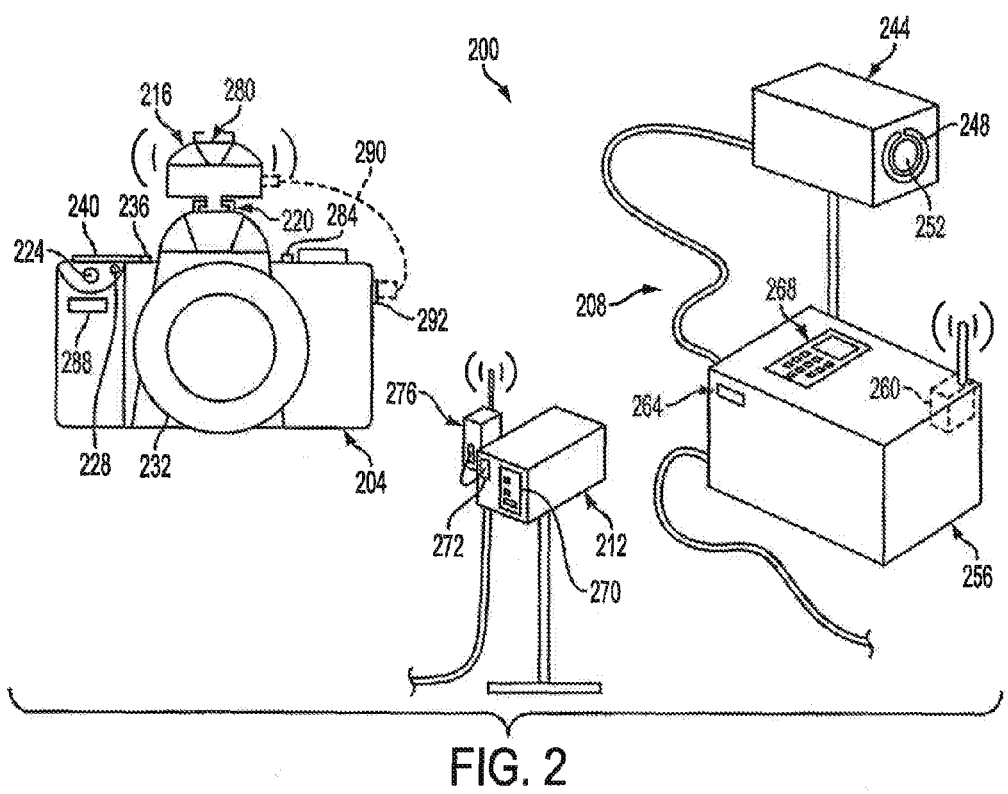
FIG. 2 is a diagram of a photographic system that includes a camera, a wireless controller, a remote multifunctional lighting system incorporating a modeling lighting source, and a special effects fan, wherein the system is configured to perform steps of the methods of FIG. 1A and/or FIG. 1B.

FIG. 2 illustrates an exemplary photographic system 200 that is configured to carry out the steps of method 100 of FIG. 1A and/or method 150 of FIG. 1B. Referring to FIG. 2, and also to FIG. 1A, photographic system 200 includes a camera body 204 and two continuous type modeling lighting apparatuses, namely, a multifunction lighting system 208, which includes a continuous modeling light, and a dedicated modeling lighting device 212. In this example, each modeling lighting apparatus 208, 212 is controllable from camera body 204 via a controller 216 mounted to a hotshoe 220 on the camera body. As described below in detail, controller 216 is configured to control the modeling lighting functionality of multifunction lighting system 208 in one, the other, or both of a wake mode and an autofocus assist mode, depending on a user's preference, and to control modeling lighting device 212 in a backlight control mode. Briefly, wake mode of controller 216 uses a camera body wake signal and a corresponding camera body sleep signal each generated by camera body 204 to control scene illumination output levels of continuous type modeling lighting of multifunction lighting system 208. The wake signal may be generated by any of a variety of controls on camera body 204. However, a very useful control for a photographer to use to initiate the wake signal is a shutter release button 224 on camera body 204, a partial press (commonly referred to as a "half press") of which causes the camera body to generate a wake signal. The corresponding sleep signal is typically automatically generated by camera body 204, for example, by an internal microprocessor, after a preset time following release of the shutter release or other control.

Autofocus assist (AFA) mode of controller 216 uses a camera body autofocus assist signal generated by camera body 204 to control scene illumination output levels of the modeling lighting of multifunction lighting system 208. In this example, camera body 204 is configured to generate an autofocus assist signal in two ways, a first in response to a user pressing an autofocus ("AF") button 228 located on the camera body within ready reach of a photographer's thumb and a second in response to the camera body (via autofocus circuitry (not shown)) determining that a lens 232 attached to the camera body needs to be actuated to bring the scene into focus. The generation of camera body autofocus assist signals in both of these manners is well known in the art such that further description is not necessary herein for those skilled in the art to implement the broad concepts disclosed herein.

In this example, backlight (B/L) mode of controller 216 uses a camera body 204 backlighting control signal generated by camera body to control scene illumination output levels of modeling lighting device 212. In this case, camera body 204 includes a backlighting control button 236 that a user uses to turn backlighting of one or more displays, such as LCD display panel 240, on the camera body on and off as desired. It is noted that differing camera body models have differing ways of handling backlighting functionality and signaling. For example, some current camera body models have on-actuators like backlight control button 236, whereas others have on-switches. In most current camera bodies, each type of actuator is used in conjunction with a built-in timer used to control when the camera body turns the backlighting off. In addition, some current camera body models make the camera body backlighting signaling available at the hotshoe of the camera body, whereas others do not. As will be seen below, camera body 204 of FIG. 2 is of the type that makes camera body backlight signaling available at hotshoe 220. Camera body 204 is also configured like many conventional camera bodies to make camera body wake (and sleep) and autofocus assist signals available at hotshoe 220. Further details of wake, AFA and B/L modes of controller are described below in greater detail after a description of multifunction lighting system 208 and modeling lighting device 212.

In this example, multifunction lighting system 208 includes a dual function lighting head 244 that provides both image acquisition strobe light from a flash source 248 (such as a xenon flash tube) and continuous light from a continuous light source 252 (such as a tungsten bulb). Lighting head 244 is powered by a suitable generator pack 256. A similar multifunctional lighting system is available from Profoto, Stockholm, Sweden, among other photographic lighting manufacturers. Generator pack 256 includes a built-in wireless communications device 260 and an onboard microprocessor (not shown) responsive to a relatively robust set of user-settable lighting control parameters, including modeling lighting control parameters. Parameters for operating multifunction lighting system 208 that a user is able to set/control using wireless communications device 260 include illumination output level settings. In this example, wireless communications device 260 implements a pair of illumination level change delay setting. The use of these parameters and settings is described below in greater detail.

Wireless communications device 260 is in wireless RF communication with controller 216 so as to receive one or more instructions (sets) for controlling the operation of multifunction lighting system 208. In this connection, wireless communications device 260 includes an RF receiver (not shown). In other embodiments, wireless communications device 260 may also include an RF transmitter or, alternatively to separate RF receiver and transmitter, an RF transceiver. It is noted that in yet other embodiments, wireless communications may be implemented using another communication technique, such as visible-light communication (e.g., using a strobe attached to controller 216) and infrared communication, among others.

When an instruction (of instruction set, depending on the communication protocol) containing a power level setting is received by the built-in microprocessor of generator pack 256 (for example via built-in wireless communications device 260, an external port 264 or a built-in user interface 268), the onboard microprocessor changes the output illumination level of continuous light source 252 to the setting provided in that instruction (set). If a delay value is not also provided with the instruction (set), continuous light source 252 will stay at the new setting until the microprocessor receives another power state instruction, such as another illumination output setting or a power-off instruction. However, when the onboard microprocessor of generator pack 256 receives an instruction (set) containing first and second power level settings and a delay setting, the built-in microprocessor first changes the illumination output of continuous light source 252 to the first power level setting, holds the illumination output for the delay setting and then changes the illumination output to the second power level setting. The power level setting may be expressed in any convenient form, such as percentage of maximum output power, absolute input power or absolute output power, among others. The delay setting may also be expressed as any convenient value, such as number of seconds, minutes or other predefined periods.

In this example, modeling lighting device 212 is a standalone modeling lighting device that utilizes a continuous light source (on hidden side of device 212, but such as a tungsten bulb, a light-emitting diode (LED) or an array (panel) of LEDs) to provide continuous light at a user-selectable illumination output level. Such a modeling lighting device is available from Elinca, Geneva, Switzerland, among other photographic lighting manufacturers. Modeling lighting device 212 includes an onboard controller (not shown) that can be set to any one of various illumination output levels via either of an integrated user interface 270 and a wired communications port 272. Because modeling lighting device 212 does not have a built-in wireless communications device like generator pack 256, the modeling lighting device is supplemented with an external RF wireless communications device 276 that is in wired communication with wired communications port 272 of the device. In this example, modeling lighting device 212 is configured to be toggled between two user-preset illumination output levels set by a user via integrated user interface 270 in response to it receiving a certain trigger signal. Consequently, wireless communications device 276 is in wireless RF communication with controller 216 so as to receive first and second IOC signals (which may be the same as one another) that cause wireless communications device 276 to provide each certain toggling trigger signal to modeling lighting device 212. In this connection, wireless communications device 276 includes an RF receiver (not shown). In other embodiments, wireless communications device 260 may also include an RF transmitter or, alternatively to separate RF receiver and transmitter, an RF transceiver. It is noted that in yet other embodiments, wireless communications may be implemented using another communication technique, such as visible-light communication (e.g., using a strobe attached to controller 216) and infrared communication, among others.

In this example, wireless RF communications among controller 216, wireless RF communications device 260 of generator pack 256 and wireless RF communications device 276 of modeling lighting device 212 includes the ability of each of these devices to distinguish signaling meant for it from signaling meant for any other device. This can be accomplished in any of a variety of ways, such as by each device having a unique address and including in each transmission the unique address(es) of the device(s) intended to receive a particular transmission. Further detail of such signaling techniques is beyond the scope of this disclosure and is not needed for those skilled in the art to implement such techniques, since they are known in the art.

As those skilled in the art will readily appreciate, hotshoe 220 has a number of electrical contacts (not shown) for communicating various signals to and/or from an accessory, typically a flash device or strobe-controlling radio, mounted to the hotshoe. In this example, camera body 204 is of a type that outputs a camera body wake/sleep signal(s) via one of the pins, denoted the first pin, and outputs a camera body autofocus assist signal via the same first pin. Also in this example, the camera body wakeup signal is characterized by a first voltage change, here from a low level to an intermediate level, the camera body sleep signal is characterized by a second voltage change, here from the intermediate level to the low level, and camera body autofocus assist signal is identified by a third voltage change, here from the intermediate level to a high level. This example is discussed further below in connection with FIGS. 6 and 7. Further, in this example the camera body backlight control signal appears on a second pin different from the first pin and is identified by an increase in voltage from a low voltage to a higher voltage that is held high while the backlighting is to be on. It is noted that some current camera bodies, such as EOS-series SLRs/DSLRs available from Canon, Inc., Tokyo, Japan, do not provide backlight signals externally through a hotshoe, whereas other current camera bodies, such as SLRs/DLSRs available from Nikon Corporation, Tokyo, Japan, provide backlight on/off information via a status bit in a digital communications bit cluster, for example to allow the camera-body backlighting control signal to control backlighting on a flash unit mounted to the hotshoe. Other camera bodies can have different backlighting signaling arrangements, such as the one illustrated in FIGS. 6 and 7.

Another characteristic of this example is that backlight control mode is of a non-delay-type. That is, the camera body backlighting stays on until a user turns it off, here, using backlighting control button 236. Consequently, when a user activates camera body backlight control button 236 to turn camera body backlighting on, controller 216 is configured to cause a first illumination output change in modeling lighting device 212, here from off to on. (In this example, the photographer wants modeling lighting device 212 to be on when the backlighting of camera body 204 is on. However, there may be other situations when the photographer might want modeling lighting device 212 to be off when backlighting of camera body 204 is on. These differing options are described in more detail below.) Then, when the user activates backlight control button 236 again to toggle the camera body backlighting off, controller 216 is configured to cause a second illumination output change in modeling lighting device 212, here from on to off. Further details of this control scheme are provided below.

In the current embodiment, controller 216 is not (though it could be) part of a hotshoe-mountable flash device that is fully compatible with camera body 204 (i.e., is able to use any signaling camera body 204 makes available via hotshoe 220), although such a flash device (not shown), or other flash or non-flash device, may indeed be mounted on the controller via an auxiliary hotshoe 280 that has the same signals available as the signals available at hotshoe 220. Nonetheless, in this example, controller 216 is configured to utilize some of the same information that camera body 204 normally provides to a compatible flash device via hotshoe 220. Often, however, conventional camera bodies do not provide their hotshoes with any signaling, i.e., wake, sleep, autofocus assist, backlighting, etc., if they do not recognize that a compatible device has been engaged with the hotshoe. Consequently, in such cases, wireless controller 216 can be configured with an appropriate system for causing camera body 204 to provide the needed signals. U.S. patent application Ser. No. 12/129,402 filed on May 29, 2008, and titled "System and Method For Maintaining Hot Shoe Communications Between A Camera and A Wireless Device," discloses such systems and is incorporated herein by reference for all of its teachings on these systems.

Figure 3:
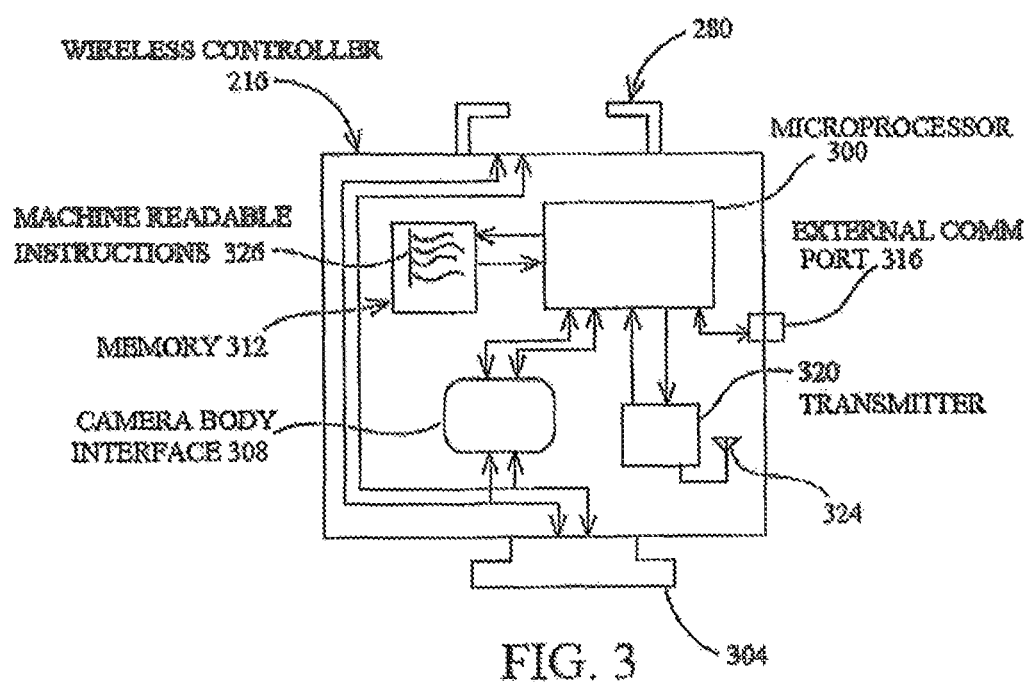
FIG. 3 is a high-level diagram of the wireless controller of FIG. 2.

Referring now to FIG. 3, and also to FIG. 2, in this example controller 216 includes, among other things, a microprocessor 300, a hotshoe connector 304, a camera body signal interface 308, memory 312, an external communications port 316, an RF transmitter 320 and an antenna 324. It is emphasized at this point, and will be recognized by those skilled in the art that the components of this example and their arrangement are presented for the sake of illustration and not limitation. Skilled artisans will understand that given the wide range of technologies available for implementing the overarching functionality disclosed herein, there are many ways of implementing this functionality. For example, while the various parts of controller 216 are shown as components discrete from one another, any two or more of the parts can be integrated onto a single integrated circuit chip, for example, as a system on chip. Similarly, various ones of the differing parts can be integrated with one another. For example, any memory provided may be partially or completely integrated with, for example, the microprocessor.

Further variations include the fact that RF transmitter 320 and corresponding antenna 324 can be replaced by another type of transmitting system, such as an infrared or visible light transmitter. An analog of the latter is a hotshoe mounted strobe device capable of sending data wireless to a remote strobe device using specially timed pulsed emissions from a flash tube. In still further variations, the parts of controller 216 provided to enable its functionality externally relative to a camera body, such as camera body 204 of FIG. 2, can be eliminated and most of the remaining parts adapted for location inside a camera body, except perhaps for an antenna, strobe, or other wireless signal transmitting device. In the case of putting the functionality of a controller of the present disclosure, such as controller 216, into a camera body, this can be accomplished by retrofitting an existing camera body or by designing the functionality into a new camera body design prior to production. In the latter case, any microprocessor(s)/circuitry used for the modeling lighting control functionality disclosed herein could be the same microprocessor(s)/circuitry that controls conventional camera functionalities. In yet other variations, any microprocessor/software implementation envisioned herein could be replaced by a purely hardware implementation at the choice of the designer. It is also noted that depending on the nature of the particular controller, the transmitter could be supplemented with a receiver, or both could be replaced by a transceiver without departing from the spirit of the embodiments disclosed and intended to be covered by the appended claims.

Returning now to the illustrative example, microprocessor 300 performs a host of functions including, but not limited to, executing machine-executable instructions 326 (e.g., firmware stored in memory 312), communicating with camera body interface 308, controlling/communicating with communications port 316, controlling/communicating with transmitter 320 and providing wireless controller 216 with its unique functionality. Camera body interface 308 receives signals from a camera body, such as camera body 204 of FIG. 2, for example via hotshoe 220, and transforms those signals as needed for use by microprocessor 300. Signals that camera body interface 308 is configured to transform in this example are a camera body wake/sleep signal, a camera body autofocus assist signal and a camera body backlight signal. An example of circuitry suitable for use in camera body interface 308 when these signals are analog voltage signals is described below in connection with FIG. 8. It is noted, however, that not all camera systems use analog signals to communicate information such as wake, sleep, autofocus assist, and backlight on/off externally from the camera body. Other camera systems handle such communication digitally, for example, using digitally encoded signals. In such cases, the camera body interface may simply be a data link to the microprocessor. Yet other camera systems may implement a hybrid approach wherein one or more signals are analog and one or more signals are digitally encoded. In the context of a microprocessor-based controller, the camera body interface would be configured to handle both types of signaling.

As alluded to above, memory 312 is used generically in FIG. 3 to denote any and all types of memory in communication with controller 216, including BIOS memory and RAM, among others, that are, as mentioned above, integrated into microprocessor 300 and/or provided externally to the microprocessor. Memory 312 contains information wireless controller 216 needs to perform its functionality, such as, but not limited to: machine-executable instructions 326 for enabling the functionality of the controller; controller setup data; controlled modeling light device parameter settings (such as illumination output levels and delay values); controlled device instructions (sets); and communications settings, e.g., transmit (and receive) frequencies, device identification codes, etc., among other things. Those skilled in the art will understand all of the various types of information that can/needs to be stored in memory 312 to make controller 216 a device that functions according to the concepts disclosed herein.

Figure 4:
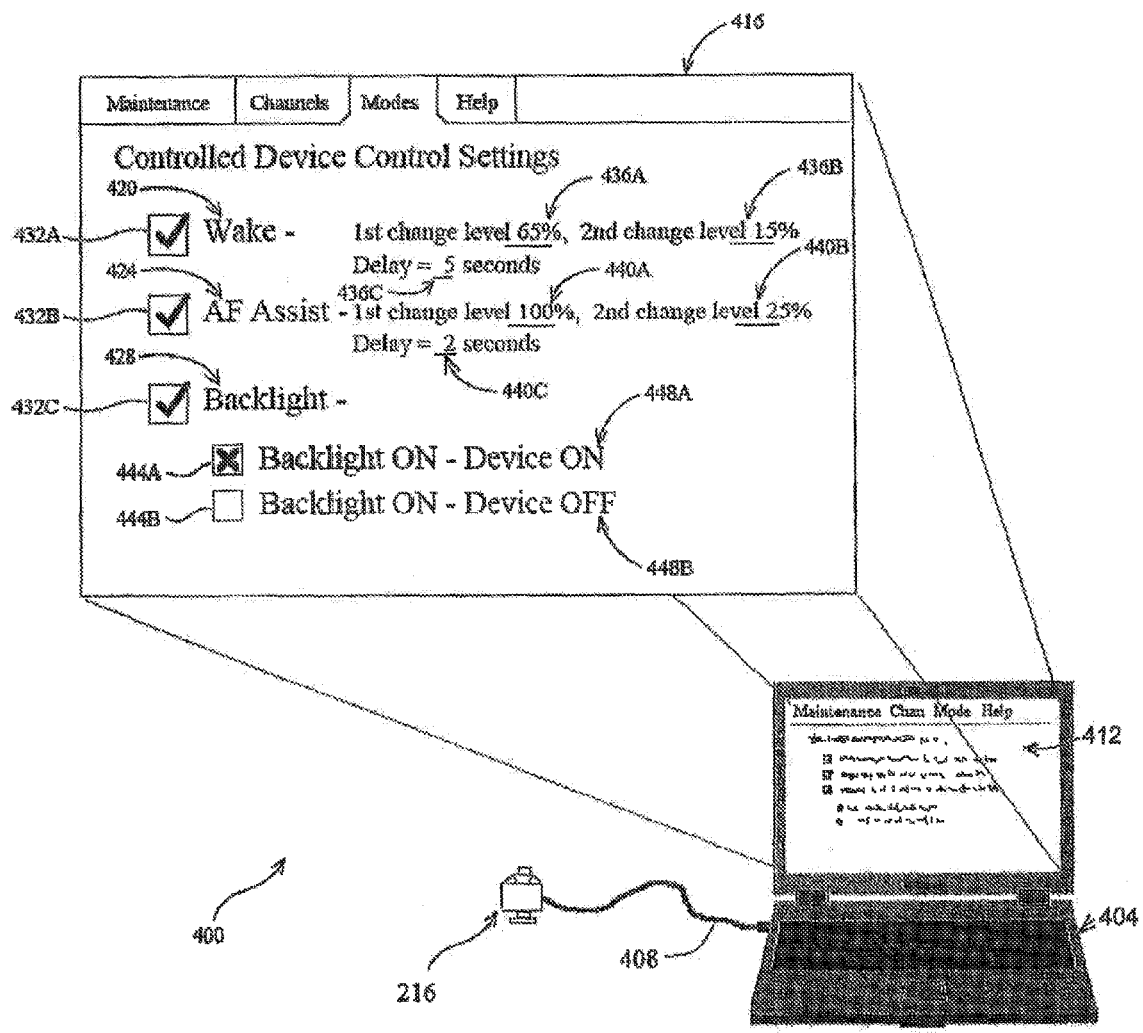
FIG. 4 is a diagram illustrating a computer-based environment for configuring a wireless controller, such as the external wireless controller of FIGS. 2 and 3.

Continuing with this illustrative example, external communications port 316 is provided for transferring information to and from controller 216. This allows a user to custom configure controller 216 and provide any needed operational settings for a particular application of the controller. In the present example, communications port 316 is a USB port. However, any other type of communications port, including a wireless port (e.g., Bluetooth, IEEE 802.11, etc.), can be provided in place of or in addition to USB port 316. In this connection, FIG. 4 illustrates controller 216 in an information transfer environment 400. In this example, controller 216 is connected to a suitable programming device, such as laptop computer 404 shown, via a USB cable 408 (since in this example external communications port 316 is a USB port). Laptop computer 404 provides a convenient vehicle for presenting to a user a graphical user interface (GUI) 412 of a software application (not shown, but running on the laptop computer in a conventional manner) designed for interacting with controller 216. GUI 412 is shown presenting a screen 416 that allows a user to select which mode(s) of device control operation the user desires to enable and also allows a user to set the appropriate parameter(s) for each of the selected modes.

It is noted that the example shown in FIG. 4 is simply that, exemplary. In other implementations the programming of a controller made according to the present disclosure can be accomplished in any one or more of a number of ways. For example, the controller can be provided with a user-interface, such as an LCD screen and one or more buttons or other input devices, a touchscreen, etc. that allow a user to program the controller. In other implementations, control parameter values for the controller can be set with one or more mechanical buttons, switches and/or dials, etc. In yet other implementations, control parameter values can be set wirelessly, for example, using a wireless port as mentioned above. In such a case, the programming device could be a smartphone (e.g., BlackBerry device, iPhone device), PDA, laptop computer, desktop computer, dedicated programming device, etc. Those skilled in the art will understand and appreciate the variety of ways that a controller of the present disclose can be programmed with desired control parameter values, if the controller is not preset with the desired values or is not programmable.

As mentioned above, in the present example, controller 216 is configured to have control functionality based on camera body wake signals ("Wake" mode 420), camera body autofocus assist signals ("AF Assist" mode 424) and camera body backlight controls signals ("Backlight" mode 428). Correspondingly, GUI 412 provides three primary selection controls (here a common GUI-type checkboxes 432A-C) corresponding respectively to the three modes 420, 424, 428. As will be seen below, a user can select any one, any two or all three of these modes 420, 424, 428, as desired.

If a user selects checkbox 432A indicating Wake mode 420, the wake mode parameter selection input fields 436A-C become active. In this example, Wake mode selection fields 436A-C are for inputting three desired values, respectively: 1) a first illumination output level, in this example the illumination output level to which to change the modeling lighting of multifunctional lighting system 208 (FIG. 2) as a function of controller 216 detecting a camera body wake signal; 2) a second illumination output level, here the illumination output level to which to change the modeling lighting of the multifunctional lighting system from the first illumination output level; and 3) a delay value used to determine when to cause the second illumination output level change. In this example, illumination output levels are expressed as a percentage of the maximum illumination output and the delay value is expressed in seconds.

If a user selects checkbox 432B indicating AF Assist mode 424, the autofocus assist parameter selection input fields 440A-C become active. In this example, autofocus assist mode selection fields 440A-C are for inputting three desired values, respectively: 1) a first illumination output level, in this example the illumination output level to which to change the modeling lighting of multifunctional lighting system 208 (FIG. 2) as a function of controller 216 detecting a camera body wake signal; 2) a second illumination output level, here the illumination output level to which to change the modeling lighting of the multifunctional lighting system from the first illumination output level; and 3) a delay value used to determine when to cause the second illumination output level change. In this example, illumination output levels are expressed as a percentage of the maximum illumination output and the delay value is expressed in seconds.

If a user selects checkbox 432C indicating Backlight mode 428, a pair of parameter selection checkbox controls 444A-B become active. In this example, Backlight mode 428 has two sub-modes 448A-B. In first sub-mode 448A, the controlled device (here, modeling lighting device 212 (FIG. 2)) is turned on when a user turns on the camera body backlighting and is turned off when the user turns off the camera body backlighting. In second sub-mode 448B, the controlled device is turned off when a user turns on the camera body backlighting and is turned on when the user turns off the camera body backlighting. It is noted that in alternative embodiments each of first and second sub-modes 448A-B may be provided with power level fields similar to the power level fields of Wake and AF Assist modes 420, 424. However, in this example, modeling lighting device 212 (FIG. 2) is either switched on or off, so no power levels need to be set. Rather, the on- and off-signaling from controller 216 to modeling lighting device 212 will be handled properly depending on which sub-mode 448A-B is selected. That is, if first sub-mode 448A is selected, the software application running on laptop computer 404 configures controller 216 to send an on-signal to wireless communications device 260 (FIG. 2) when a user turns on the backlighting of camera body 204 and to send an off signal to that wireless communications device when the user turns off the camera body backlighting. The opposite is true of second sub-mode 448B. In another alternative in which the power state change is binary, i.e., off-on-off or on-off-on, GUI 412 may be provided with two power level fields (not shown) corresponding to the two changes. These fields may be identical to fields 436A-B, 440A-B of, respectively, Wake mode 420 and AF Assist mode 424. Then, if a user wants off-on-off functionality, the user would input 100% power for the first power level change (corresponding to the off-on transition) and 0% power for the second power level change (corresponding to the on-off transition). Of course, other alternatives are possible.

Figure 5A:
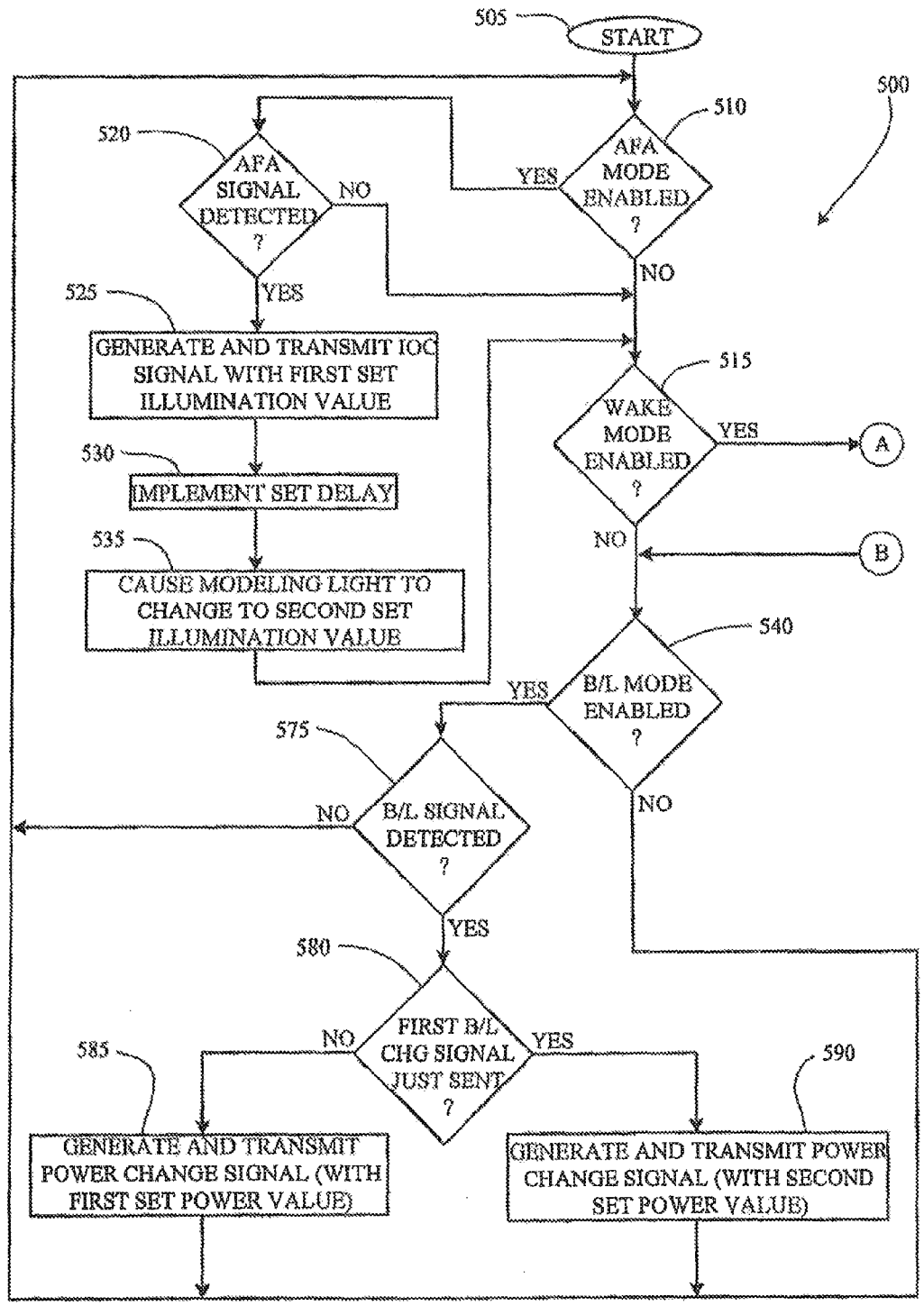
FIGS. 5A-B together contain a flow diagram illustrating a method of controlling the scene illumination output of modeling lighting using a controller having a wake mode, an autofocus assist mode and a backlight mode, such as the controller of FIGS. 2 and 3.
Figure 5B:
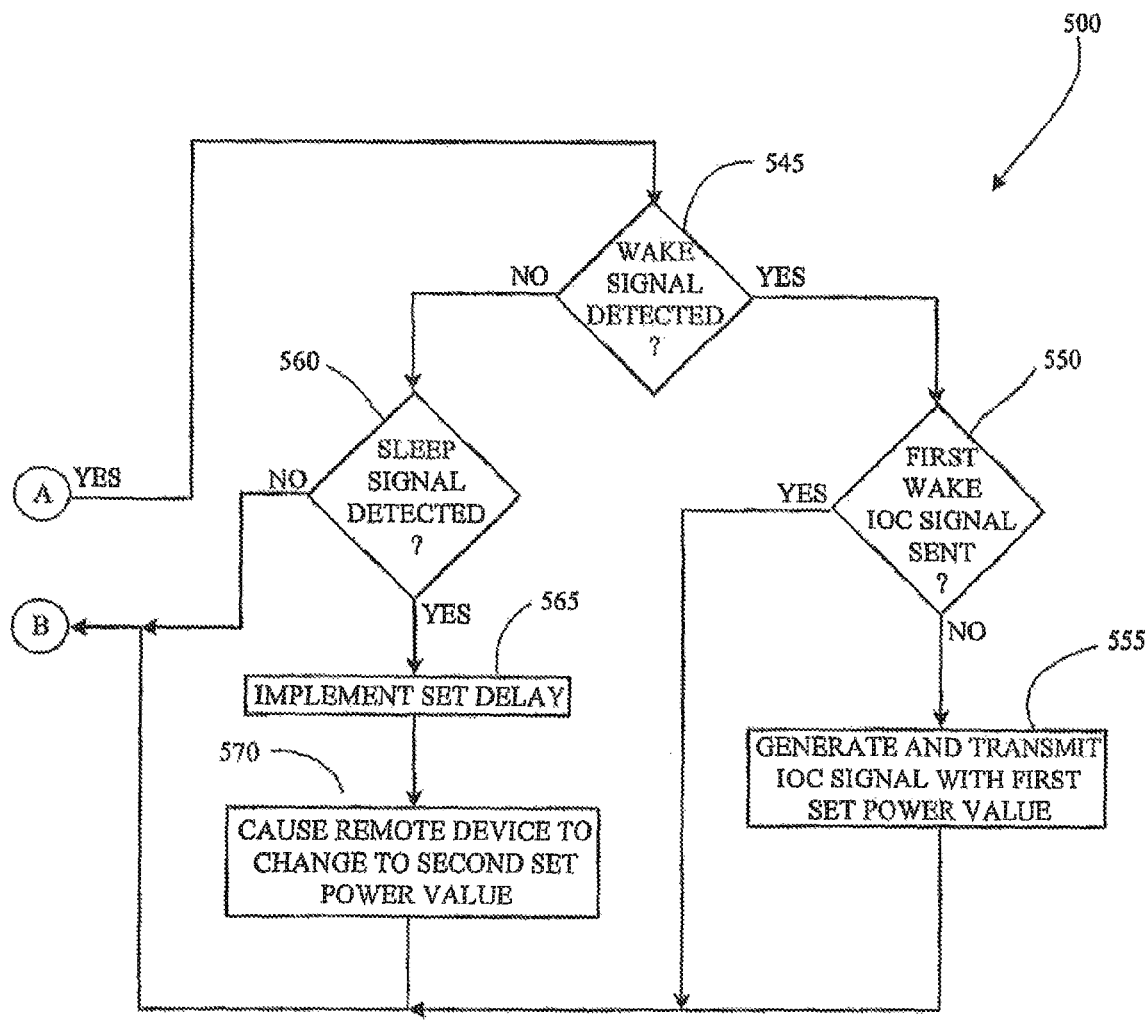

FIGS. 5A-B illustrate a flow diagram illustrating one possible method 500 of controlling controller 216 so as to provide the controller with the functionality illustrated via GUI 412 of FIG. 4. As those skilled in the art will readily appreciate, method 500 can be implemented in software, in analog circuitry and in any combination thereof. At step 505 method 500 begins. Depending on the power state of controller 216, step 505 may begin when the controller is first powered on and, if the controller has wake and sleep states to control power consumption, every time the controller is woken up. At step 510 the controller determines (or already knows) whether or not AF Assist (AFA) mode 424 is enabled. As discussed above relative to GUI 412 (FIG. 4), AF Assist mode 424 may be enabled during an appropriate setup procedure, for example, by a user checking checkbox 432B in the GUI with controller 216 in communication with laptop 404. If AF Assist mode 424 is not enabled, method 500 continues to step 515 wherein controller 216 checks to determine whether Wake mode 420 has been enabled, for example, in a manner similar to AF Assist mode 424.

However, if at step 510 controller 216 determines (or knows) that AF Assist mode 424 is enabled, then method 500 proceeds to step 520 at which the controller determines whether or not it has detected an AFA signal generated by camera body 204 (FIG. 2). If controller 216 has not detected camera body AFA signal, method 500 simply proceeds to step 515 to determine whether Wake mode 420 is enabled. On the other hand, if controller 216 has detected a camera body AFA signal, at step 525 controller 216 generates and transmits an illumination output change signal. In this example, since generator pack 256 (FIG. 2) of multifunction lighting system 208 has built-in wireless communication device 260 and is responsive to instructions containing illumination level settings, step 525 includes transmitting the first change level set in field 436A of GUI 412. In this example, controller 216 transmits the first change level signal as soon as possible after it detects the camera body AFA signal.

At step 530 controller implements the delay set in field 436C of GUI 412. In this example, generator pack 256 has an internal timer and is responsive to wirelessly received instructions that include delay values. Consequently, in one example when controller 216 transmits the IOC signal along with the first illumination level at step 525, at the same time it transmits the set delay value. Those skilled in the art will understand that other implementations can utilize a timer function built into the controller. At step 535, controller 216 causes the modeling light to change to the second change level set in field 436B of GUI 412. In the present example in which generator pack 256 is responsive to a robust instruction set, controller 216 performs step 535 by sending the second change level along with the delay value and first change level that the controller sends at step 525. Generator pack 256 then implements the change of the modeling light of multifunction lighting system 208 to the second change level after the internal timer of the generator pack times-out on the set delay value. If in another implementation controller 216 provides the timer functionality, the controller could send a second IOC signal containing the second change level in response to the timer timing out. Still further options are possible, depending on the particular capabilities of the modeling lighting devices at issue. It is noted that the flow diagram for method 500 does not capture other steps that can be implemented to provide various other operating features that may be needed to provide desired operation. For example, once controller 216 detects a camera body AFA signal at step 520, it may be desirable to disable Wake mode 420 and/or backlight (B/L) mode 428 to prevent the controller from changing the modeling lighting to an illumination output level unsuitable for assisting autofocusing.

After controller 216 performs step 535, example method 500 proceeds to step 515 at which the controller determines (or knows) whether or not Wake mode 420 is enabled. If Wake mode 420 is not enabled, method 500 proceeds to step 540 at which controller 216 determines (or knows) Backlight (B/L) mode 428 is enabled. However, if Wake mode 420 is enabled (step 515), at step 545 controller 216 determines whether or not it detects a camera body wake signal. In this example (as seen further below in connection with FIG. 7), the camera body wake signal is an analog signal indicated by an intermediate-level rise in a line voltage on the first pin of hotshoe 220 (FIG. 2). (In this example, a high level rise in that line voltage indicates the presence of an AFA signal (see FIG. 7 and accompanying description.) When this line voltage is at the intermediate-level voltage, the camera body wake signal is said to be present. Correspondingly, a drop in the line voltage from the intermediate-level voltage corresponds to a sleep signal.

If controller 216 detects a camera body wake signal at step 545, method 500 proceeds to step 550, which in this example is implemented because the method is set up to continually loop through the various branches of the method. At step 550, controller 216 determines whether or not it has already sent a first IOC signal based upon an earlier recognition that the camera body wake signal was high (in this example, at the intermediate-level voltage). If controller 216 has not already sent such first IOC signal, method 500 proceeds to step 555, wherein the controller generates and transmits that first IOC signal. As will be seen below relative to FIG. 7, in this example, step 555 essentially causes the modeling lighting of multifunction lighting system 208 to change almost instantaneously after the leading edge of the line voltage begins to rise toward the intermediate level. In this example, the sending of the first IOC signal at step 555 includes sending to wireless communications device 260 (FIG. 2) of generator pack 256 the first change level noted in field 440A of GUI 412. After controller 216 sends the first IOC signal at step 555, method 500 proceeds to step 540 so as to continue the looping. If at step 550 controller 216 determines that the first IOC signal from step 555 was sent previously since the current camera body wake signal became present, method 500 proceeds to step 540 and continues the continual looping.

If at step 545 controller 216 did not detect a wake signal, then method 500 proceeds to step 560 at which the controller detects whether a camera body sleep signal has occurred. If a camera sleep signal has not occurred, method 500 proceeds to step 540 to continue the looping nature of the method. In this example, the user-set delay value present in field 440C of GUI 412 (FIG. 4) is implemented relative to the camera body sleep signal. Since wireless communication device 260 includes a built-in timer, when controller 216 detects a camera body sleep signal at step 560 it proceeds to step 565 in which it implements the set delay value from field 440C. In this example, controller 216 accomplishes step 565 by transmitting to wireless controller a second IOC signal that includes the second change level setting set in field 440B of GUI 412, along with a set-timer instruction and the delay value set in field 440C of GUI 412. At step 570 controller 216 causes the modeling lighting of multifunction lighting system 208 to change to the second change level set in field 440B of GUI 412. Again, controller 216 performs step 570 by way of the transmitting of the set delay value to wireless communications device 260 at the same time as the second change level setting. Generator pack 256 then changes the illumination output level of the modeling lighting to the second change level when the timer in second wireless communications device times out on the delay. In other embodiments, steps 565 and 570 can be handled differently. For example, if controller 216 were to have the timer functionality, step 565 could involve the controller setting the timer, and step 570 could involve the controller transmitting the second change level upon timing out of the timer. Of course, other possibilities exist. It is noted, too, that the delay could be initiated, for example, from the initial wake signal detection rather than the sleep signal detection. After controller has performed steps 565, 570, method 500 loops back to step 540.

In another variation in which wireless communications device 260 at generator pack 256 includes a built-in timer to handle the delay values set in fields 436C, 440C of GUI 412, this communications device may be augmented with additional timer functionality to account for instances where either camera body 204 never generates, in this example, a sleep signal (such as when a user turns the camera body off while it is still awake) or controller 216 never transmits a second IOC signal (such as when a user turns off the controller before detecting a sleep signal and/or transmitting the second IOC) or a receiver failing to receive a second IOC signal, for example, because of interference between the transmitter and receiver. In such a case, wireless communications device 260 can include a second timer that is reset with a delay value (herein called an "inactivity delay value") each time it receives a first IOC signal. This inactivity delay value will typically be stored in wireless communications device 260 and should be a value greater than any reasonably anticipated value for either of the delay values set in fields 436C, 440C of GUI 412 (FIG. 4). In one example, the inactivity delay value is set to 10 minutes, though many other values may be used.

In conjunction with the inactivity delay value, wireless communications device 260 may also be programmed with a inactivity illumination output value setting that the wireless communications device can load into generator pack 256 if the wireless communications device's timer times out on the inactivity delay value, for example, if it never receives a second IOC signal in the normal course of method 500. Again, this can happen in this example if camera body 204 never generates a sleep signal and/or controller 216 never transmits a second IOC signal, among other events. The inactivity illumination output value setting may be the same as, or different from, either or both of the illumination output value settings in fields 436B, 440B of GUI 412.

At step 540, if controller 216 detects (or knows) that Backlight (B/L) mode 428 (FIG. 4) is not enabled, method 500 simply loops back to step 510. However, if Backlight mode 428 is enabled, at step 575 controller 216 determines whether or not a camera body B/L signal (e.g., either an on or off signal) has occurred. If not, method 500 simply loops back to step 510. However, if controller 216 detects a camera body B/L signal at step 575, it proceeds to step 580 to determine whether or not it has already sent a first IOC signal at step 585 to modeling lighting device 212 (FIG. 2), in this case simply a toggling signal. If controller 216 determines it has not sent the first IOC signal, method 500 proceeds to step 585 and sends that signal. It is noted that if modeling lighting device 212 were so enabled to respond to transmitted first and second change levels, the transmission of the relevant signaling at step 585 could include such a level value. After controller 216 generates and transmits an IOC signal at step 585, method 500 loops back to step 510. If, however, at step 580 controller 216 determines that it has already sent a first IOC signal (e.g., in response to a user turning camera body backlighting on), method 500 proceeds to step 590 at which the controller generates and transmits a second IOC signal (here, simply another toggle signal), for example, in response to the user turning the camera backlighting off. After controller 216 generates and transmits an IOC signal at step 590, method 500 loops back to step 510. It is noted that as with additional optional steps of method 500 relating to AF Assist mode 424, various additional optional steps may be added relative to Wake and Backlight modes 420, 428. For example, various disabling steps and/or interrupt steps may be added to disable certain functionality and/or to allow ones of the various modes to interrupt one another. Those skilled in the art will readily understand how to implement the illustrated and other steps using well known programming and/or circuit design techniques.

Figure 6:
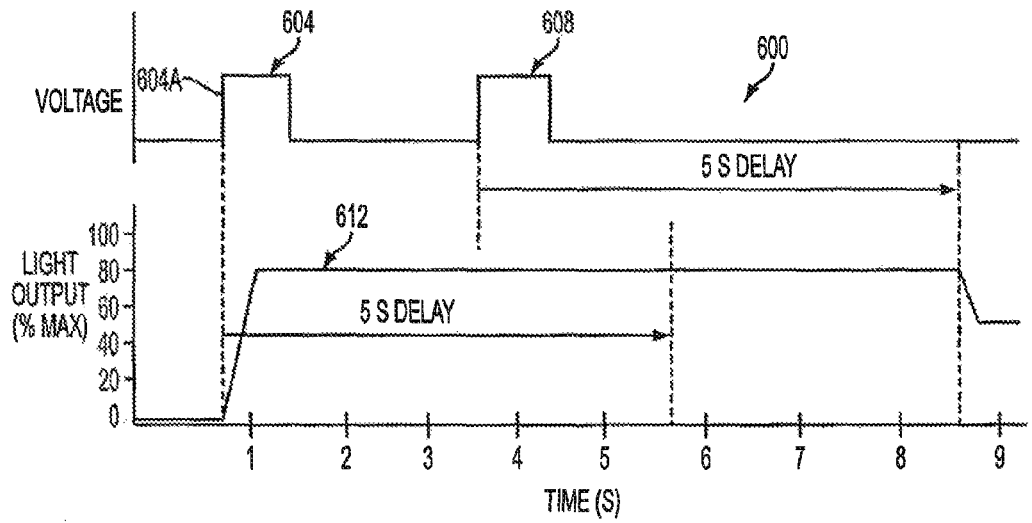
FIG. 6 is an example timing diagram illustrating functioning of the autofocus assist mode of a wireless controller, such as the controller of FIGS. 2 and 3, using the control settings illustrated on the screen of the graphical user interface of FIG. 4.
Figure 7:
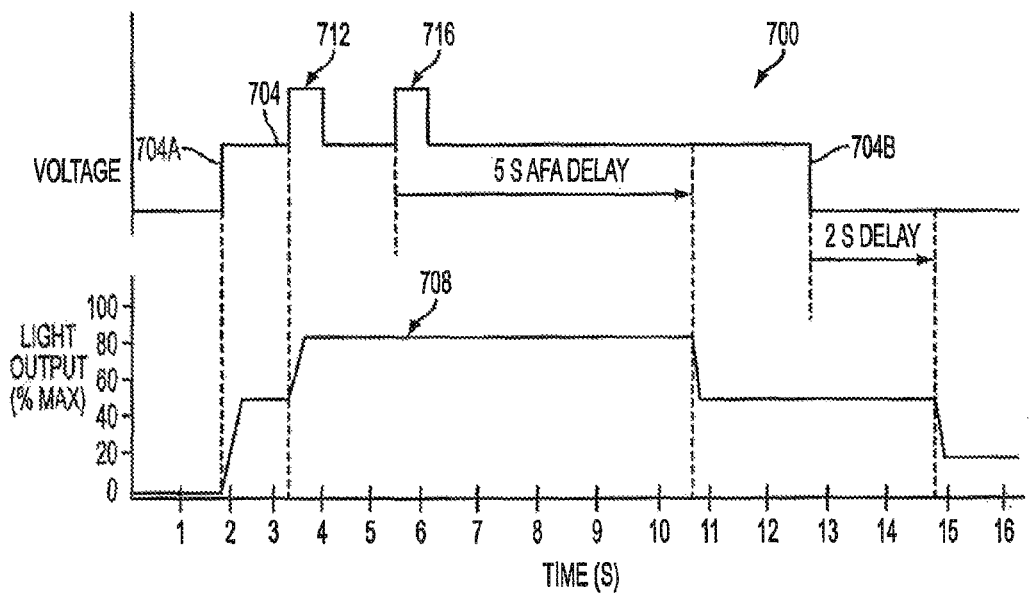
FIG. 7 is an example timing diagram illustrating functioning of the wakeup mode of a controller, such as the controller of FIGS. 2 and 3, using the control settings illustrated on the screen of the graphical user interface of FIG. 4.
Figure 8:
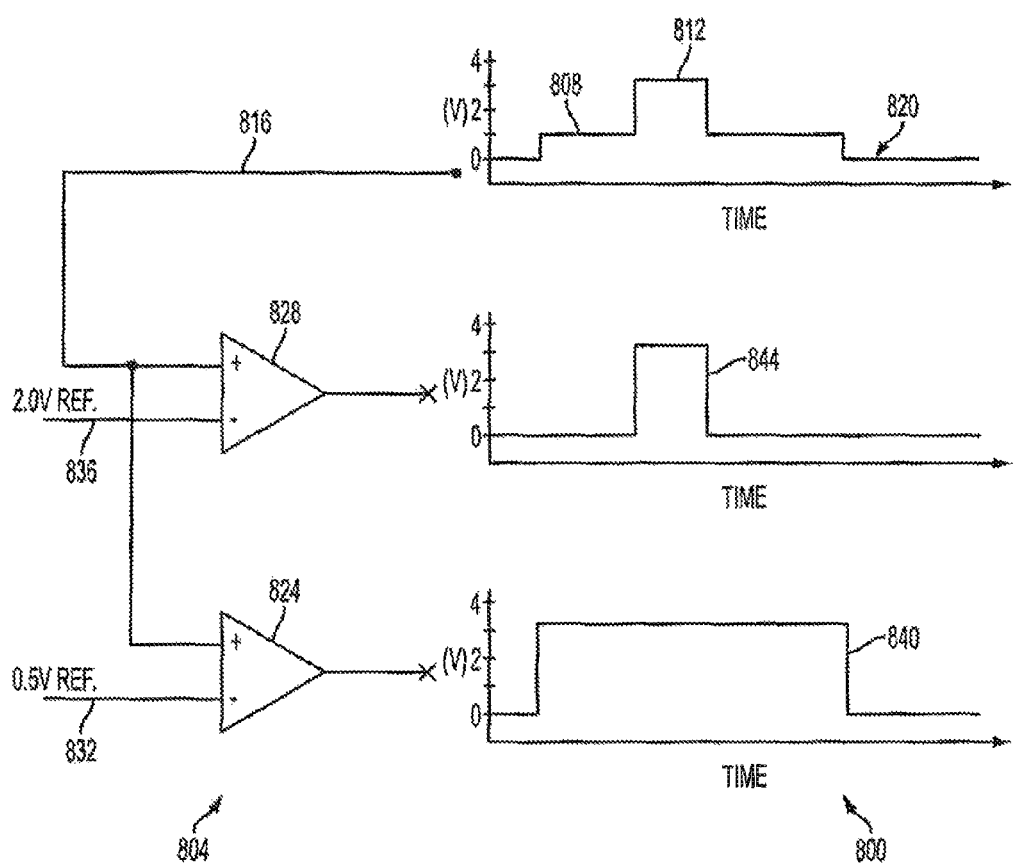
FIG. 8 is a diagram illustrating circuitry and corresponding signaling suitable for use in the camera body interface of a controller, such as the controller of FIGS. 2 and 3.

Referring now to FIGS. 6-8, and also to FIGS. 2 and 4, FIGS. 6-8 illustrate example timing diagrams 600, 700, 800 for scenarios involving ones of the Wake and AF Assist modes 420, 424 (FIG. 4). As mentioned above, these diagrams 600, 700, 800 are for a camera body, such as camera body 204 of FIG. 2, that communicates wake and autofocus assist signals via common hotshoe contacts as analog voltage signals, as opposed to digital data packet signals. That said, as mentioned above those skilled in the art could readily implement the same sort of control scheme in a digital instruction signaling environment that uses digital packet signal analogs to the analog voltage signals. In timing diagrams 600, 700, the settings for Wake mode 420 are: first power change level=50%; second power change level=15%; delay=2 seconds, and the settings for AF Assist mode 424 are: first power change level=80%; second power change level=60%; delay=5 seconds. These settings are shown on screen 416 of FIG. 4.

Referring to FIGS. 2, 4 and 6, timing diagram 600 of FIG. 6 is an example in which only AF Assist mode 424 is enabled. In this example, camera body 204 (FIG. 2) has generated first and second AFA signals 604, 608 approximately 2 seconds apart from one another. Camera body 204 may generate each AFA signal 604, 608 in any number of ways, such as in an automatic mode in response to a user performing a half-press on shutter release button 224 of the camera body or in response to the user pressing a dedicated AFA button 228 of the camera body. When wireless controller 216 first detects the leading edge 604A of first AFA signal 604, in this example, it generates and transmits a modeling light instruction (set) containing the first power change level, the second power change level and the delay values set, for example, via GUI 412 of FIG. 4. Once generator pack 256 receives this instruction (set), as represented by modeling light illumination output curve 612 it changes the output level of the modeling light to the first power change level (here, 80%) from whatever level the modeling light was set to prior to receiving the instruction (set) (here, 0%) and starts a delay timer (not shown) internal to the modeling light using the preset delay value (here, 5 seconds).

If controller 216 does not detect another AFA signal in about 5 seconds from detecting first AFA signal 604, i.e., in about the time of the delay value, the built-in timer of wireless communications device 260 will time-out and this wireless device will initiate via generator pack 256 the second power level change of the modeling light to the preset level (here, 60%). However, in the case illustrated in FIG. 6, within about 2 seconds of detecting first AFA signal 604, controller 216 detects second AFA signal 608, which in this example causes the controller to send the same instruction (set) it sent in response to the detection of the first AFA signal. When wireless communications device 260 receives this second instruction (set), it initiates the first power level change (which is not actually a change since the first power change level had already been set in response to first AFA signal 604) of the modeling light and re-sets its internal timer to the preset delay value. Since in this example controller 216 does not detect another AFA signal within about 5 seconds (again, the preset delay) of second AFA signal 608, after the built-in timer of wireless communications device 260 times out, as seen by modeling light illumination output curve 612, this communications device initiates the second power change and changes the modeling light output level to the second power change level (here, 60%).

Referring now to FIGS. 2, 4 and 7, timing diagram 700 of FIG. 7 is an example for a scenario in which both Wake and AF Assist modes 420, 424 are enabled. In this example, when the controller 216 detects a leading edge 704A of a wake signal 704, it generates and transmits a modeling light instruction (set) that contains the first power change level. When wireless communications device 260 receives that instruction (set), as illustrated by modeling light illumination output curve 708, it changes via generator pack 256 the modeling light output level from whatever level it was previously set to (here 10%) to the first power change level (here, 50%). As seen from timing diagram 700, while camera body 204 remains awake (and correspondingly, wake signal 704 remains high), the camera body generates first and second AFA signals 712, 716, in this example 1.5 seconds apart from one another. When controller 216 detects the leading edge 712A of first AFA signal 712, it generates and transmits a modeling light instruction (set) in a manner essentially the same as described above relative to FIG. 6. This instruction (set) includes the first power change level, the second power change level and the delay for the AF Assist mode (here, respectively, 80%, 60%, 5 seconds). Upon receiving such instruction (set), as seen by modeling light illumination output curve 708, generator pack 256 changes its modeling light power output to 80% and sets its internal timer to 5 seconds.

Like the example of FIG. 6, if controller 216 does not detect another AFA signal in about 5 seconds from detecting first AFA signal, i.e., about the time of the AF Assist mode delay value, the built-in timer of wireless communications device 260 will time-out and will cause generator pack 256 to make the second power level change to the preset level (here, 60%). However, in the scenario illustrated in FIG. 7, within about 1.5 seconds of detecting first AFA signal 712, controller 216 detects second AFA signal 716, which in this example causes the controller to send the same instruction (set) it sent in response to the detection of first AFA signal. When wireless communications device 260 receives this second instruction (set), as seen by modeling light illumination output curve 708, it initiates via generator pack 256 the first modeling light power level change (which is not actually a change since the first power change level had already been set in response to first AFA signal 712) and re-sets the communications device's timer to the preset delay value. Since in this example controller 216 does not detect another AFA signal within about 5 seconds (again, the preset delay) of second AFA signal 512, after the built-in timer of wireless communications device 260 times out, as seen by modeling light illumination output curve 508, the wireless communications device initiates the second power change and changes the output level of the modeling light to the second power change level (here, 60%).

In this example, after the timer internal to wireless communications device 260 has timed out from second AFA signal 716, camera body 204 is still awake for a few seconds, as indicated by wake signal 704 still being high. Camera body 204 may remain awake, for example, because a user continues to hold shutter release button 224 at half-press. However, once controller 216 detects the trailing edge 704B of wakeup signal 704 (i.e., a sleep signal), it generates and transmits to wireless communications device 260 a modeling light instruction (set) containing the wakeup mode second power change level (here, 15%) and the wake mode delay (here, 2 seconds). When wireless communications device 260 receives this instruction (set), it sets its internal delay timer to 2 seconds. When the internal timer times out, as seen by modeling light illumination output curve 708, wireless communications device 260 causes generator pack 256 to change its modeling light output level from the current level (here, the 60% level from the second power change of AF Assist mode 424) to the second power change level (here, 15%). As described above, if controller 216 is so enabled, after this last transmission it may enter a sleep mode to save power.

FIG. 8 illustrates example circuitry 804 that may be used in, for example, camera body interface 308 (FIG. 3) of controller 216 (FIGS. 2 and 3) to convert "raw" camera body wake and AFA signals 808, 812 available, in this example, at hotshoe 220 of camera body 204 to signals suitable for use in microprocessor 300 of the controller. In the context of example circuitry 804, camera body wake and AFA signals 808, 812 are of the same analog character as the like signals 604, 608, 704, 712, 716 of FIGS. 6 and 7, above. More precisely, in this example, wake signal 808 is characterized by a rise in voltage from a low voltage (here, 0V) to a midlevel voltage (here, 1V), and autofocus signal 812 is characterized by a rise in voltage from the midlevel voltage to a high voltage (here, 3.5V).

Circuitry 804 includes an input 816 that carries an input voltage signal 820 that contains wake and AFA signals 808, 812 when they occur. Input 816 is electrically coupled to inputs of corresponding respective first and second comparators 824, 828 that each compare input voltage signal 820 to a particular reference voltage on a corresponding reference voltage line 832, 836. Here, the reference voltage for first comparator 824 is 0.5V, which allows the first comparator to output a wake-signal-present signal 840 when wake signal 808 is present on input 816. Similarly, the reference voltage for second comparator 828 is 2V, which allows the second comparator to output an AFA-signal-present signal 844 when AFA signal 812 is present on input 816. In this example, wake-signal-present and AFA-signal-present signals 840, 844 are provided as inputs to microprocessor 300 (FIG. 3). If the I/O voltage regime of microprocessor 300 is 0V to 3.3V, then the wakeup-signal-present and AFA-signal-present signals 840, 844 output from comparators 824, 828 are either about 0V or about 3.3V, depending on whether corresponding wake and AFA signals 808, 812 are present on input voltage signal 820. Of course, those skilled in the art will readily appreciate that other circuitry may be used.

While the foregoing example is directed to an analog signaling scheme, those skilled in the art would readily be able to implement control concepts of the present disclosure in a digital signaling scheme where a camera body communicates various state and control information internally and/or externally using digitally encoded information. In addition, it is noted that while the foregoing example is directed to a controller located externally relative to a camera body, as mentioned above a controller of the same, like or other control functionality can be built into a camera body. A potential advantage of building a controller implementing broad concepts of the present disclosure into a camera body is that a greater variety of camera body signals would likely be available, since typically only a subset of the signals generated by a camera body are normally available externally to a camera body through various ports on the camera body.

Figure 9:
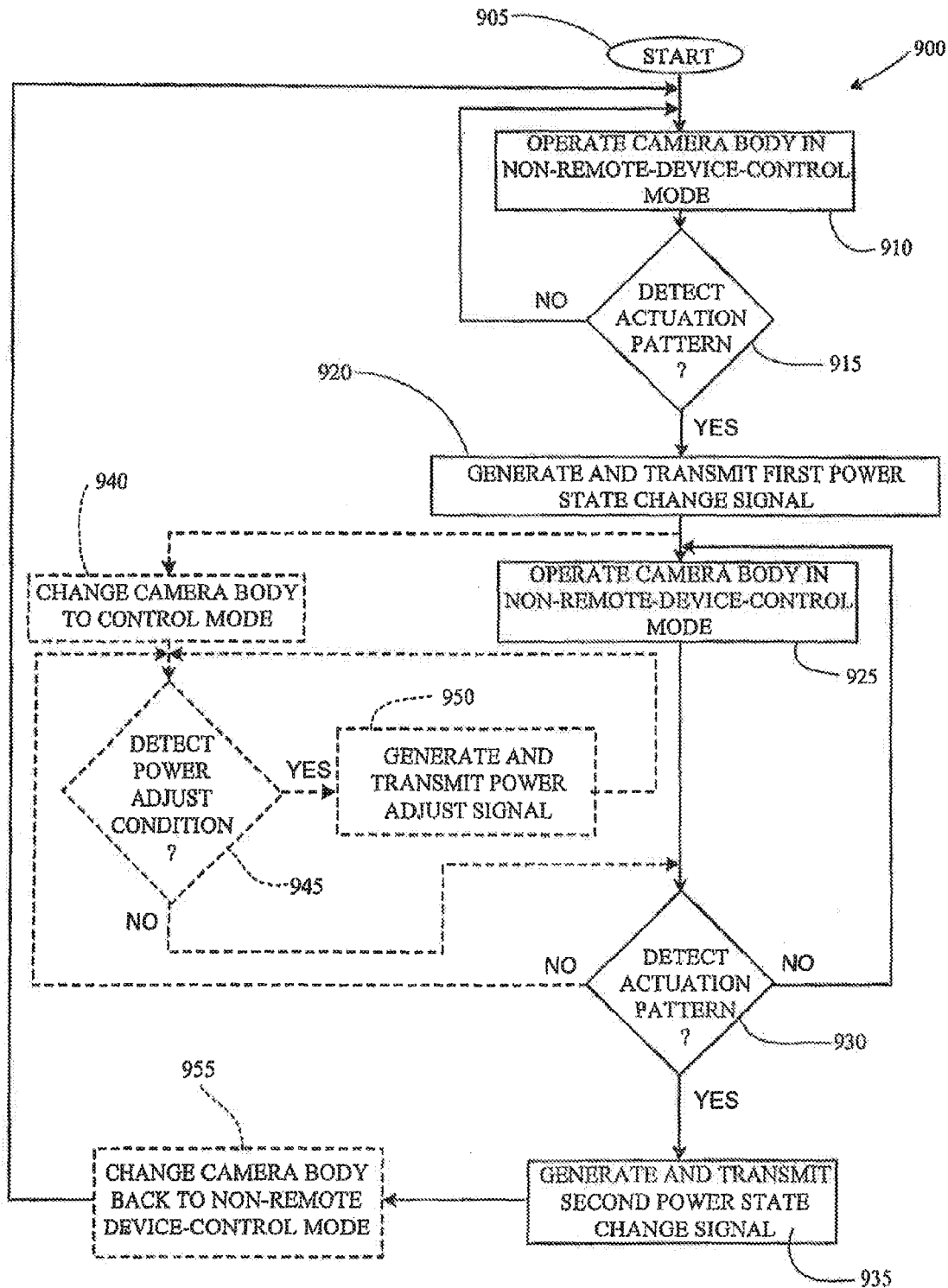
FIG. 9 is a flow diagram illustrating another method of using a camera body to control illumination output of modeling lighting.
Figure 10:
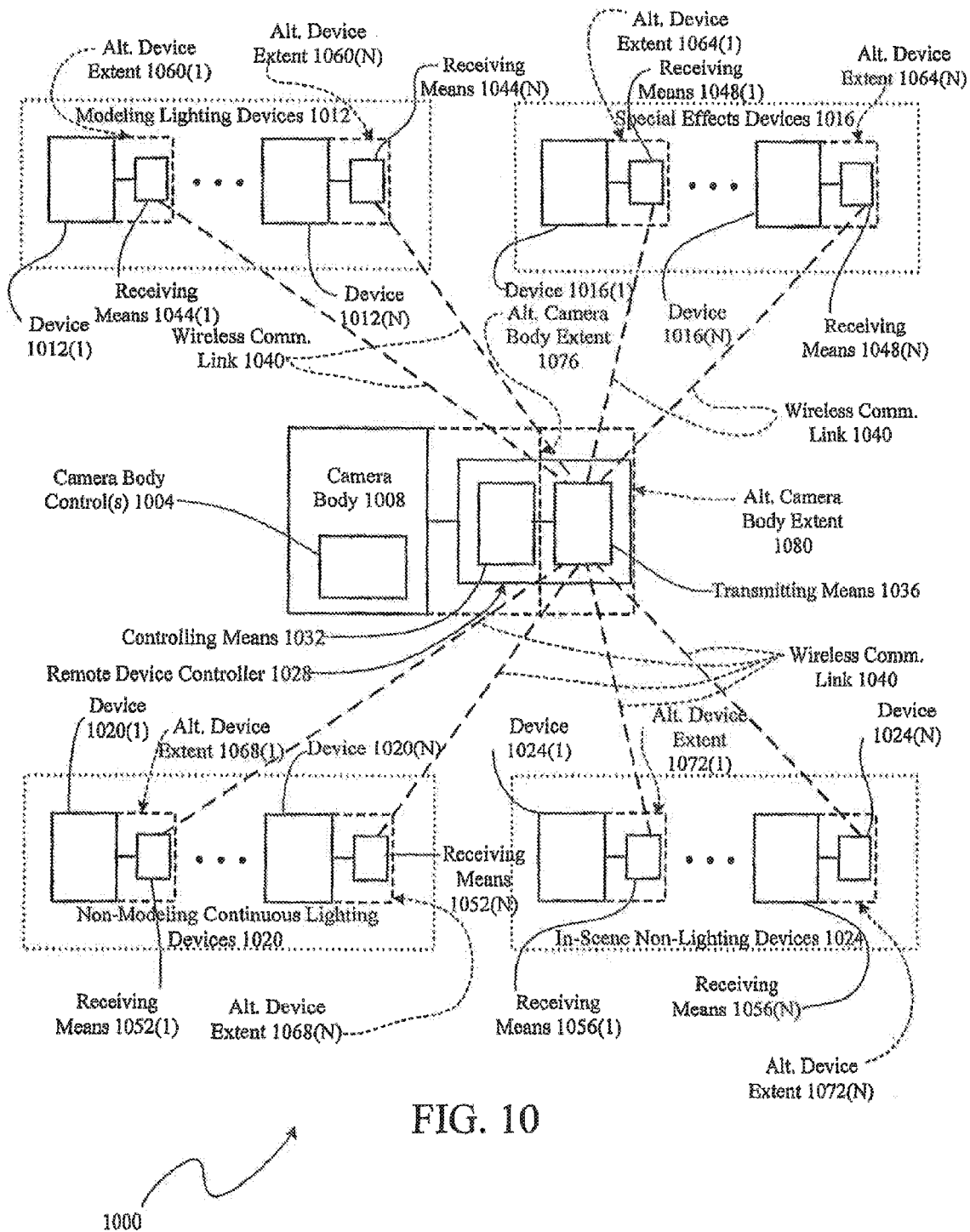
FIG. 10 is a high-level diagram illustrating a flexible control system for controlling a host of devices, including modeling lighting devices, special effects devices, non-modeling continuous lighting devices and in-scene non-lighting devices, using one or more camera body controls of a camera body.

For example and referring to FIG. 9 and also to FIG. 2, FIG. 9 illustrates a method 900 of using one or more camera body controls, such as shutter-release control (button), menu-on/off button, scroll wheel/selector button (a/k/a "click wheel"), camera body backlighting control, etc., to control power states of a controllable device, such as the modeling lighting functionality of multifunctional lighting system 208 and/or modeling light 212 (FIG. 2), the special effects devices 1016, 1108 (FIGS. 10 and 11), the non-modeling lighting continuous lighting devices 1020, 1104, 1112 (FIGS. 10 and 11) and/or the in-scene non-lighting devices 1024 (FIG. 10). Relative to example camera body 204, that camera body includes shutter-release button 224, a menu-on/off switch 284, a click wheel 288 and backlighting control switch 236. As mentioned above, shutter-release button 224 of camera body 204 implements the common partial (half) press feature that activates a partial-press switch (not shown) that results in a partial-press signal within the camera body that can cause the camera body to initiate a variety of functionality, such as wakeup, autofocusing, through-the-lens metering, etc., as will be understood by those skilled in the art. Menu-off/on switch 284 in this example is a button-type switch that results in a menu on/off signal within camera body 204. The scroll wheel portion of click wheel 288 is a control commonly used on contemporary digital single lens reflex cameras (often in combination with another control) that allows a photographer to efficiently scroll through a list of camera body settings. As one example, a scroll wheel is sometimes used in flash compensation mode to allow a photographer to scroll among flash compensation values. Often (as here), though not always, a scroll wheel is incorporated into a button-type switch that allows a photographer to make a selection by pressing on the control wheel. When a user actuates the scroll wheel of click wheel 288, a scroll wheel signal is generated internally to camera body 204. Similarly, when a user actuates the selector button of click wheel 288, the selector button signal is generated internally to camera body 204. The microprocessor (not shown) of camera body 204 uses these signals to control the appropriate camera body functionality.

Method 900, however, can implement any one or more of these and/or other camera body signals to allow a user to control operation of modeling lighting. Method 900 provides such control by interpreting one or more patterns of user-actuation of one or more camera body controls to be instructions for controlling operation of modeling lighting. As used herein and in the appended claims, the term "pattern" is intended to cover multiple actuations of one or more controls, such as three rapid partial presses of a shutter-release button, as well as the simultaneous and/or sequential actuation of two or more controls, such as actuating backlighting control switch 236 while holding down menu on/off switch 284, among many other possibilities. As will be readily appreciated by those skilled in the art, there are so many possible scenarios of such patterns that it is not practical, or even possible, to list every one. That said, those skilled in the art will understand that whatever pattern(s) is/are selected for implementation, an important overarching concept is that each pattern be so as to minimize the likelihood of the pattern or any portion thereof inadvertently changing a camera body setting not relating to the control of modeling lighting.

Method 900 begins at step 905, for example, when the camera body (here, camera body 204) is powered on. At step 910, camera body 204 operates as it normally would upon powering up from an off state. At step 915, a remote device controller monitors control signaling occurring within camera body 204 to determine whether a preset pattern of control actuation has occurred. As mentioned above, a preset pattern can be any of a variety of sequential actuation of any one or more camera body controls or simultaneous actuation of two or more camera body controls, or a combination thereof. For the sake of illustration, a rapid triple partial pressing of shutter-release button 224 (e.g., a user partially presses the shutter-release button three times in uninterrupted sequence within about one second) is used as the preset actuation pattern for toggling a modeling lighting control mode on and off. In other words, when step 915 detects the rapid triple partial press every odd-numbered time following startup at step 905, i.e., every $1^{st}$, $3^{rd}$, $5^{th}$, $7^{th}$, etc. time after startup, the modeling lighting controller enters the modeling lighting control mode. When the modeling lighting controller enters the modeling lighting control mode, it generates and transmits a first IOC signal (or, more generally, a first power state change signal) to one or more modeling lighting and/or other controlled devices, such as multifunctional lighting system 208 and/or modeling lighting device 212 of FIG. 2. Again, it is noted that method 900 is not limited by this example to controlling modeling lighting devices. Rather, the same and similar concepts can be used to control any of a wide variety of other devices, such as the special effects devices 1016, 1108 (FIGS. 10 and 11), the non-modeling lighting continuous lighting devices 1020, 1104, 1112 (FIGS. 10 and 11) and/or the in-scene non-lighting devices 1024 (FIG. 10).

Depending on the robustness of the wireless control scheme of each device so controlled, in a manner similar to method 500 of FIG. 5 described above, the transmitting of the first power state change signal may or may not be accompanied by a power level setting, such as an illumination output level, that the controlled device is to be changed to upon receiving the first power state change signal. In one example, this "change power level to" value may be input into the remote device controller in a manner similar to the manner illustrated in FIG. 4 relative to controller 216 of FIG. 2. In another example, the remote device controller implementing the method of FIG. 9 may simply send, effectively, a toggle command to one or more controlled devices that causes each such device to toggle from one power state (e.g., illumination output level) to another, such as from off to on, or vice versa.

It is noted that a remote device controller that implements method 900 may be the same as or similar to controller 216 of FIGS. 2 and 3 or controller 1028 of FIG. 10. Indeed, an external controller, such as controller 216 itself, could be configured to perform method 900 for a number of camera bodies. Although most, if not all, currently available camera bodies do not make half-press switch signals available through a hotshoe (e.g., hotshoe 220), many camera bodies make such signaling available via one or more other external ports on the camera body, for example, a USB port or a proprietary port. Often this is done to allow a camera body to be remotely controlled. Consequently, an external controller enabled to perform method 900 could include a connection, such as a wired connection (e.g., wired connection 290 of FIG. 2), between a camera body port having access to partial-press signaling and itself (e.g., proprietary port 292). The circuitry aboard such a controller, for example, camera body signal interface 308 and microprocessor 300 (FIG. 3), could be configured to recognize the preset pattern, such as the rapid triple partial-press mentioned above. In alternative embodiments, like the alternative embodiments mentioned above relative to controller 216 vis-a-vis FIG. 3, a modeling light controller that implements method 900 or similar method may be located substantially entirely internally to the camera body. For example, the microprocessor(s) and other circuitry and software (e.g., firmware) already present with a particular camera body for providing non-remote-control functionality, can be adapted to provide the functionality embodied in method 900. Those skilled in the art will readily understand how to implement such a camera-body based scheme.

If the remote device controller does not detect a preset camera body control actuation pattern at step 915, method 900 simply loops back to step 910 and continues with non-remote-device-control operation. However, if the remote device controller has detected a preset user control pattern at step 915 and transmitted the first power state change signal at step 920, method 900 may in one embodiment proceed to step 925 wherein camera body 204 resumes its normal non-remote-device-control operation. If method 900 proceeds to step 925, it may then proceed to step 930 at which the remote device controller monitors the camera body control signal lines to determine whether another preset user control actuation pattern has occurred. In this example, the pattern is another rapid triple partial pressing of shutter-release button 224, but in other embodiments, the pattern at issue may be different from the pattern at step 915. If the remote device controller does not detect the pattern at issue at step 930, method 900 loops back to step 925 and camera body 204 continues in normal non-remote-device-control operation, while the remote device(s) changed in response to step 920 remain so changed.

However, if the remote device controller detects the preset actuation pattern at step 930, method 900 proceeds to step 935 at which the controller generates and transmits a second power state change signal (e.g., a second IOC signal in the context of modeling lighting control), along with any change-to-power-level setting. In one example, wherein the first power state change signal turned-on a particular remote device, the second power state change signal turns off that device. Method 900 then loops back to step 910 and the camera body, such as camera body 204 (FIG. 2), 1008 (FIG. 10), 1120 (FIG. 11), operates in its normal non-remote-device-control mode while the modeling lighting remains in whatever state it just turned to in response to step 935.

In the foregoing steps of method 900 just described, the camera body could be considered to not have changed modes of operation at any time, but rather may be considered to simply send appropriate first and second power state change signals in response to the controller detecting the corresponding preset camera body control actuation pattern(s). In an alternative embodiment illustrated by the portion of method 900 in dashed lines, the camera body may be considered to change modes, since the functionality of one of the camera body controls (e.g., click wheel 288) changes to suit a particular purpose after the modeling lighting controller has transmitted the first power state change signal at step 920. In one example, the first power state change signal transmitted at step 920 causes modeling lighting to turn on from an off state. Instead of continuing "normal" operation of the camera body at step 925, method 900 proceeds to step 940 at which the camera body may be said to change its mode of operation to a remote device "control mode."

In one example utilizing click wheel 288 on camera body 204, this change of mode means that the camera body changes the functionality of the scroll wheel from any of its conventional uses, such as flash-compensation adjustment, to a control for adjusting the illumination output of modeling lighting essentially in real time while the camera body is in the modeling lighting control mode. The same mode of control could also be used, for example, to adjust the speed of a special effects fan, the speed of a snow shaker, the output of a misting device, and the illumination output of in-scene lighting, among many other things. As those skilled in the art will appreciate, utilizing the scroll wheel functionality of click wheel 288 as a power adjustment control can be readily accomplished in camera body control software (firmware) in conjunction with an appropriately configured remote device controller that utilizes the variable signal resulting from a user turning the scroll wheel. For example, as a user turns the scroll wheel of click wheel 288 in one direction, the remote device controller could interpret this action as requiring it to transmit to one or more controlled devices a series of increasing power state changes (e.g., illumination output levels, speed levels, etc.) in a coordinated manner with the turning of the scroll wheel. Conversely, when the user turns the scroll wheel of click wheel 288 in the opposite direction, the remote device controller would interpret this action as requiring it to transmit to the one or more controlled devices a series of decreasing power state changes in a coordinated manner with the turning of the scroll wheel.

This adjustment via click wheel corresponds to step 945 of method 900 at which the remote device controller detects whether or not a power adjustment condition (in the foregoing example, the turning of the scroll wheel portion of click wheel 288) is occurring. If so, method 900 proceeds to step 950 at which the remote device controller generates and transmits to the one or more controlled devices one or more illumination output adjustment signals. In the context of generator pack 256 of multifunction light system 208 of FIG. 2, which has a robust set of operating instructions, such an adjustment signal may include a series of transmitted illumination power levels corresponding to the user's movement of the wheel portion of click wheel 288. If at step 945 the remote device controller does not detect a power adjustment condition, method 900 proceeds to step 930 where the controller determines whether or not a preset actuator pattern is detected. If not, the camera body remains in the remote-device-control mode and method 900 loops back to step 945. However, if the remote device controller detects the preset camera body control actuation pattern that causes the controller to end the remote device control mode, method 900 proceeds to step 935 and then to step 955. At step 935, the remote device controller generates and transmits a second power state change signal that, for example, turns one or more controlled devices off. At step 955, the remote device controller changes the camera body from the remote device control mode back to the non-remote-device-control mode. Immediately following step 955, for example, the scroll wheel of click wheel 288 resumes the functionality it had prior to camera body 204 entering controlled device control mode.

To briefly illustrate the usefulness of the full functionality of method 900, assume modeling lighting is desired to be on only for a few seconds so as to allow a photographer to check for desired and undesired effects that an image-acquisition strobe flash will have in a captured image. Assume further that the photographer is standing at a camera (which is enabled to perform the steps of method 900, such as with an internal modeling lighting controller and wireless transmitter), the modeling lighting is presently turned off and the photographer does not know what the illumination output level of the modeling lighting will be when it is turned on. Instead of leaving the camera to check the illumination output setting(s) of the modeling lighting and turn the modeling lighting on, while the photographer is still standing at the camera, and even while looking through the camera's viewfinder, the photographer can turn the modeling lighting on, make any needed illumination output adjustments and then turn the modeling lighting off using one or two finger controls that the photographer is already intimately familiar with.

As a specific example, and assuming the camera has a combination click wheel and the remote device controller is responsive to signals therefrom as follows, the photographer could turn the modeling lighting on by rapidly double pressing the click wheel (steps 910, 915, 920). This would also put the camera into a modeling lighting control mode (step 940). Then, while in this mode, the photographer could adjust the light output of the modeling lighting by turning the click wheel (steps 945, 950) and then make the assessment of the lighting effect(s). Once the photographer has finished the lighting assessment, the photographer may then turn the modeling light off and change the camera back to its "normal" operating mode by again rapidly double pressing the click wheel (steps 930, 935, 955). The photographer could then move on to image capturing. As mentioned above, this general process can be used to control and make power output level adjustments to a host of devices.

While FIGS. 2-8 are directed specifically to controlling modeling lighting devices and FIG. 9 was explained largely in the context of modeling lighting, methods incorporating broad concepts disclosed herein, such as methods 100, 150, 500 and 99 of FIGS. 1A-B, 5A-B and 9, respectively, can be used to control virtually any type of controllable device. FIG. 10 generally illustrates this concept. FIG. 10 illustrates diagrammatically a flexible system 1000 that allows a photographer to control any one or more of a myriad of devices of any one or more types using one or more camera body controls 1004 located on a camera body 1008. In this example, devices that are controllable include modeling lighting devices 1012 (1012(1)-(N)) (which may be similar to modeling lighting apparatuses 208, 212 of FIG. 2), special effects devices 1016 (1016(1)-(N)) (such as a fan, a snow shaker, a misting device, a fogger, a rain maker, a sprayer, etc.), non-modeling continuous lighting devices 1020 (1020(1)-(N)) (such as ambient lighting (e.g., general studio/room lighting), in-scene lighting (e.g., electric lamps), etc.) and in-scene non-lighting devices 1024 (1024(1)-(N)) (such as a motorized train set, magnetic actuator, etc.). As those skilled in the art will appreciate, the general steps illustrated in methods 100, 150 of FIGS. 1A-B, respectively, can be used to control any one or more of controlled devices 1012, 1016, 1020, 1024 singly or in various combinations with one another, as described in more detail below.

To enable the remote control functionality, system 1000 includes a remote device controller 1028 that issues one or more appropriate power state change signals to one or more of controlled devices 1012, 1016, 1020, 1024. To accomplish this, remote device controller 1028 includes a controlling means 1032 and a transmitting means 1036. Controlling means 1032 detects the one or more camera body signals designated for controlling the one or more controlled devices 1012, 1016, 1020, 1024 and, in response thereto, generates the appropriate signal(s) and any corresponding information, such as device identifier(s) for identifying the particular device(s) for receiving the signal(s). Controlling means 1032 can be implemented in any of a variety of ways in a manner similar to controller 216 discussed above relative to FIGS. 2-9. These ways include: a microprocessor and software (firmware) combination; a microprocessor, software and hard circuitry combination; and hard circuitry alone. Those skilled in the art will readily understand how to implement any of these ways when confronted with particular camera body signaling and other design parameters. The signals generated by controlling means will have any of a variety of configurations, depending on the robustness of the signaling the relevant ones of controlled devices 1012, 1016, 1020, 1024 are designed to handle. Such signaling ranges, for example, from a simple toggling signal to signals that include power state settings for the first and second power state change, delay settings and device identification codes.

Transmitting means 1036 transmits the signal(s) generated by controlling means 1032 via wireless communications "links" 1040 to corresponding respective ones of controlled devices 1012(1)-(N), 1016(1)-(N), 1020(1)-(N), 1024(1)-(N) via corresponding respective receiving means 1044(1)-(N), 1048(1)-(N), 1052(1)-(N), 1056(1)-(N). Transmitting and receiving means 1036, 1044(1)-(N), 1048(1)-(N), 1052(1)-(N), 1056(1)-(N) can utilize any suitable communications mode, such as wireless RF communications (in which case wireless communications links 1040 will be wireless RF links), wireless optical (infrared (IR), visible) communications (in which case wireless communications links 1040 will be wireless optical links), etc. In the case of wireless RF communications, transmitting means 1036 may be an RF transmitter or RF transceiver and each receiving means 1044(1)-(N), 1048(1)-(N), 1052(1)-(N), 1056(1)-(N) may be an RF receiver or RF transceiver. In the case of wireless optical communications, transmitting means 1036 may be, for example, an IR transmitter (transceiver) or a visible light transmitter (e.g., flash lighting strobe) (transceiver), and each corresponding receiving means 1044(1)-(N), 1048(1)-(N), 1052(1)-(N), 1056(1)-(N) may be an IR receiver (transceiver) or visible light receiver (transceiver). Those skilled in the art will readily understand how to implement the desired communications mode as needed to suit a particular design.

Each controlled device 1012(1)-(N), 1016(1)-(N), 1020(1)-(N), 1024(1)-(N) shown in FIG. 10 is shown as having a corresponding alternative device extent 1060(1)-(N), 1064(1)-(N), 1068(1)-(N), 1072(1)-(N) to indicate that the corresponding receiving means 1044(1)-(N), 1048(1)-(N), 1052(1)-(N), 1056(1)-(N) can be located essentially internally relative to that controlled device rather than externally ("essentially" being used to indicate that one or more parts of the receiving means, such as antenna, optical sensor, etc., may be located externally). For example, any one of receiving means 1044(1)-(N), 1048(1)-(N), 1052(1)-(N), 1056(1)-(N) may be built into the corresponding controlled device 1012(1)-(N), 1016(1)-(N), 1020(1)-(N), 1024(1)-(N) or may be provided as an aftermarket solution.

Similarly, camera body 1008 is shown as having differing alternative extents 1076, 1080 to show that remote device controller 1028 and various parts thereof can be located either internally or externally relative to the camera body, depending on the particular design at issue. For example, when camera body 1008 excludes the entirety of remote device controller 1028, the controller may be a hotshoe mountable device, such as shown with controller 216 of FIGS. 2 and 3. However, in alternative embodiments, one or both of controlling means 1032 and transmitting means 1036 may be included within camera body 1008. In an example of the former, controlling means 1032 may be implemented in the onboard microprocessor (not shown) of camera body 1008 and transmitting means 1036 implemented in an external accessory RF transmitter. In an example of the latter, controlling means 1032 may be implemented in the onboard microprocessor (not shown) of camera body 1008 and transmitting means 1036 implemented in an onboard transmitter provided in the camera body, for example, at the time of manufacture.

Regardless of how remote device controller 1028 is configured relative to camera body 1008, it may readily be configured to perform methods of the present disclosure, such as methods 100, 150 of FIGS. 1A-B. For example, remote device controller 1028 may be configured to have the same or similar functionality as described above relative to controller 216 in connection with FIGS. 2-9, including the programmability illustrated relative to FIG. 4 and the signaling and functioning illustrated relative to FIGS. 5-9. In this connection, it is noted that the functionality of controller 216 described above relative to FIGS. 2-9 is specific to modeling lighting. However, those skilled in the art will understand that the illumination output levels and control of modeling lighting devices 208, 212 are readily translatable into power state levels and control of non-modeling lighting devices, such as special effects devices 1016, non-modeling continuous lighting devices 1020 and in-scene non-lighting devices 1024.

Figure 11:
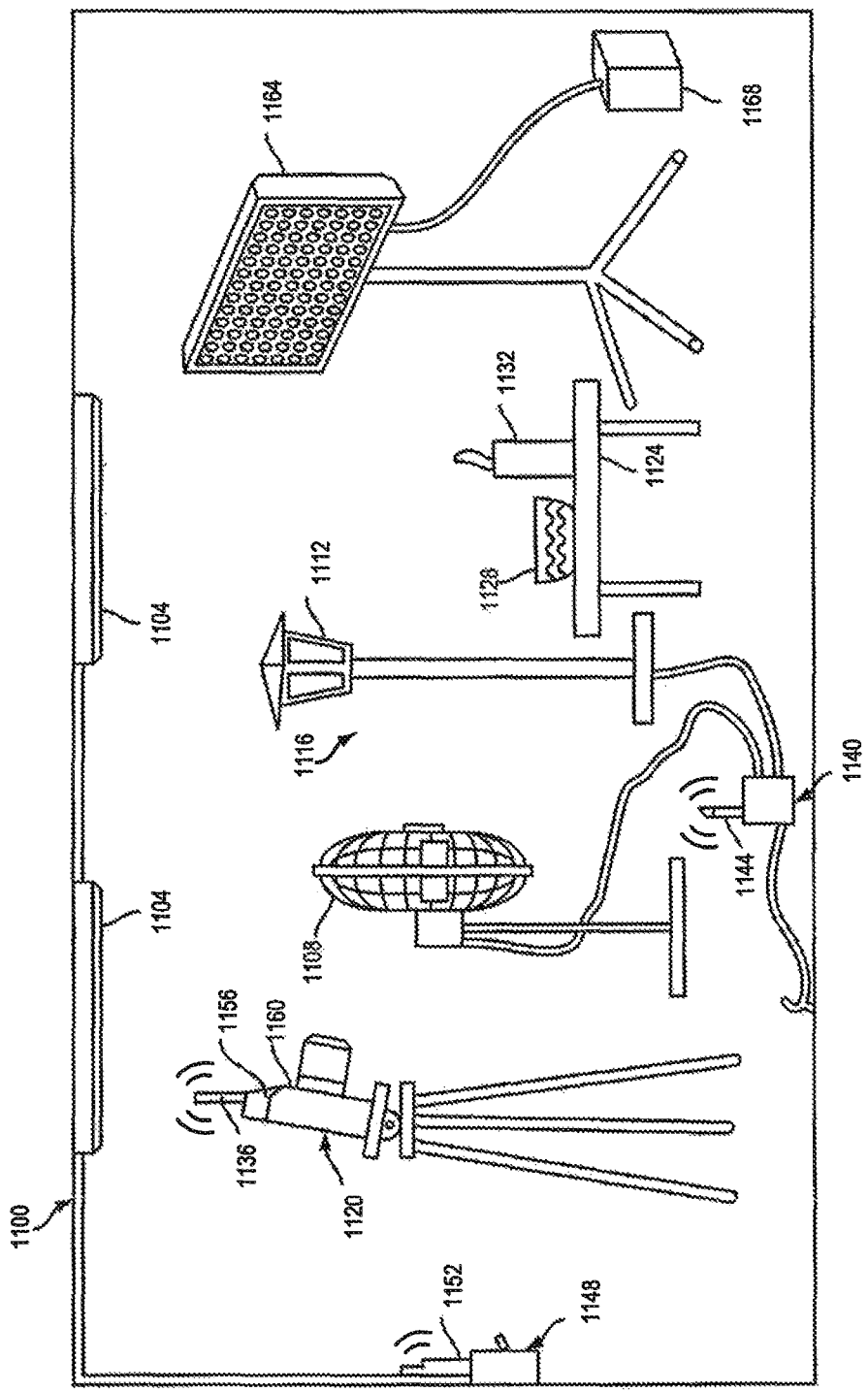
FIG. 11 is an elevational view of a photography studio containing a photographic system that includes a camera, ambient lighting devices and an in-scene lighting device, wherein the system is configured to allow a photographer to control operation of the ambient lighting devices and in-scene lighting device using the body of the camera.

For example, FIG. 11 illustrates a scenario within a photography studio 1100 in which a remote device controller (not shown, but the same as or similar to remote device controller 1028 of FIG. 10) is used to control non-modeling lighting devices, specifically, general studio lighting devices 1104, a special effects fan 1108 and an in-scene lighting device, i.e., a post lamp 1112. In this example, the remote device controller is configured in a manner similar to controller 216 of FIGS. 2 and 3, has settings similar to the settings shown in GUI 412 of FIG. 4, and performs the steps of method 500 of FIGS. 5A-B at least with respect to Wake mode 420 and Backlight mode 428 (FIG. 4). In particular and as described below in more detail, Wake mode 420 is used to control both fan 1108 and post lamp 1112, and Backlight mode 428 is used to control studio lighting devices 1104.

Studio 1100 contains a scene 1116 to be photographed using a camera body 1120. In this example, scene 1116 includes post lamp 1112, a table 1124, a bowl 1128 and a lit candle 1132 resting on the table. Scene 1116 is to be a very dimly lit scene, with the only light to be present when images are being captured by camera body 1120 during the image-acquisition phase being low levels of light from post light 1112 and from lit candle 1132. Light levels during image acquisition are to be so low that any ambient lighting other than light from post light 1112 and lit candle 1132 must be extinguished. Also during image capture, fan 1108 is used to create a gentle breeze so as to cause lit candle 1132 to flicker slightly.

In this example, the remote device controller is built into camera body 1120 and includes an RF transmitter (not shown, but evidenced by antenna 1136 on the camera body). As mentioned, both fan 1108 and post light 1112 are being controlled using Wake mode 420 (FIG. 4). Here, a single power controller 1140, which includes a built-in RF receiver (not shown, but evidenced by antenna 1144), is used to control both fan 1108 and post light 1112 by varying the electrical power provided to those devices. Power controller 1140, in this example, includes a built-in timer (not shown) and is configured to be responsive to wireless signals containing power state change settings and a delay value in a manner similar to the modeling light of multifunctional lighting system 208 of FIG. 8. Consequently, when the remote device controller detects a wake signal, it generates and transmits a signal that contains 1) the power state for power controller 1140 to change fan 1108 and post light 1112 to upon receipt of the signal, 2) the power state for the power controller to change the fan and post light to when the delay times-out, and 3) the delay value. These correspond to the values set in fields 436A-C of GUI 412 of FIG. 4. Note that in the present case, the values for fields 436A-C are, respectively, 10%, 0% and 20 seconds. That is, the power states of fan 1108 and post light 1112 are very low upon the first power state change and are off after the expiration of the 20 second delay. The 20 second delay gives the photographer about a 20 second window for capturing images.

As mentioned above, studio lighting devices 1104 are controlled using Backlight mode 428 (FIG. 4), and during image capturing it is desired that the studio lighting be turned off. To facilitate this, studio 1100 includes a special switch 1148 that can be toggled on and off under wireless control. Consequently, switch 1148 includes a wireless receiver (not shown, but evidenced by antenna 1152). Referring to FIG. 4, sub-mode 444B of Backlight mode 428 is selected in this example so that when the camera body backlighting is turned on, switch 1148, and hence studio lighting devices 1104, are turned off. Then, when a photographer is ready to acquire one or more images of scene 1116 under low-level lighting conditions, the photographer simply needs to turn the camera backlighting on, for example, using a backlighting control switch 1156 on camera body 1120. The photographer may do this at any desired time, for example, after he/she turns on fan

1108 and post light 1112, which can be accomplished by actuating a partial-press of a shutter-release button 1160 on camera body 1120. As described above, a partial-press typically causes a camera body, such as camera body 1120 to generate a camera body wake signal, which the remote device controller aboard the camera body then uses to perform the process of controlling fan 1108 and post light 1112 via power controller 1140. Those skilled in the art will readily understand that this example is merely illustrative and in no way should be construed as limiting. There are many ways of controlling studio lighting devices 1104, fan 1108, post light 1112 and other devices using the broad concepts disclosed herein.

Studio 1100 of FIG. 11 also includes an LED-array modeling lighting device 1164, which, in this example is powered by a battery pack 1168. Modeling lighting device 1164 can be controlled using any suitable one of the control schemes disclosed herein for controlling remote devices, such as the control schemes described above or devised in the spirit of the specifically disclosed control schemes and the present disclosure. An advantage of implementing such a control scheme in connection with LED-array modeling lighting device 1164, other than the sheer ease, is that the device can be controlled to be turned on and/or adjusted to the appropriate power level substantially only when its light is needed, thereby reducing the power drain on battery pack. When such control schemes are utilized with other modeling lighting devices, and other light devices generally, these control schemes can greatly reduce usage of those devices, thereby extending the time between replacements of burned-out light bulbs. This can result in significant cost savings in replacement bulbs over time.

Figure 12:
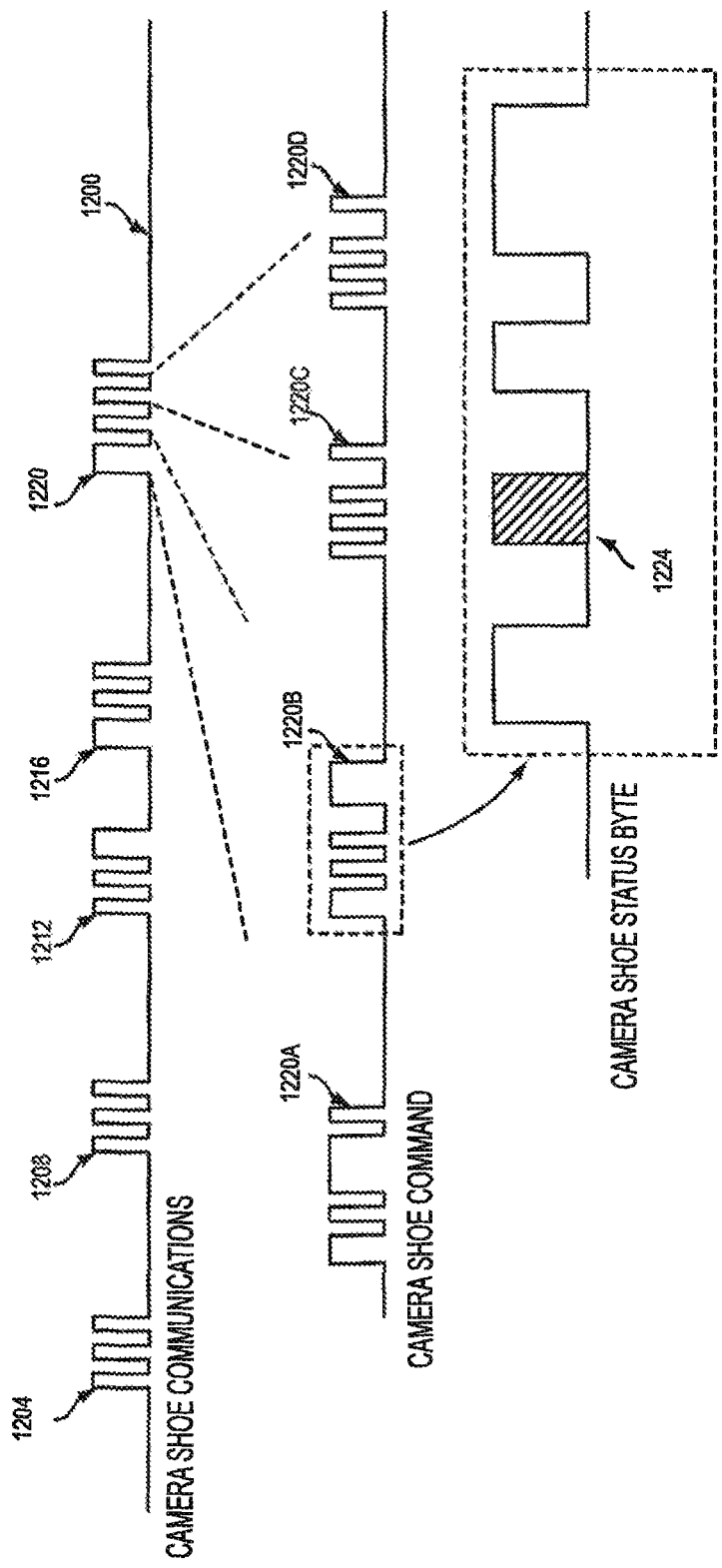
FIG. 12 is a diagram illustrating a digital camera-body-status communication signal containing autofocus assist and backlight information that a controller of the present disclosure can use to control one or more modeling lighting device(s).

As mentioned above, remote-device control functionality disclosed herein can be implemented regardless of whether the camera body signal(s) utilized is/are analog signals or digital signals. The examples of FIGS. 6-8, above, are directed to utilizing analog AF assist and backlighting control signals of a corresponding camera body that generates such signals to achieve the described exemplary remote-device control functionality. For the sake of completeness, FIG. 12 illustrates a digital camera-body-status communication signal 1200 that generally includes digital equivalents to the AF assist and backlighting signals discussed above. In this example, when the camera body is awake the camera body continually broadcasts camera-body/flash status and settings information via communication signal 1200 in the form of digital data bursts, here 1204, 1208, 1212, 1216, 1220 that each contain, for example, 12 to 24 bytes of status information, bits of which indicates statuses of various camera-body/flash status and settings. In this example, FIG. 12 shows four bytes 1220A-D of such 12 to 24 bytes of burst 1220, and one of these bytes, i.e., byte 1220B, contains a status bit 1224 of interest. In this example, status bit 1224 is a bit that indicates whether or not the backlight is on, with a high value (1) indicating on and a low value (0) indicating off. Byte 1220B or other byte of any one of the data bursts can also include a status bit indicating that an AF-assist request has been made. The same is true for many other camera-body signals, such as a red-eye-reduction signal, among others. When the camera-body signals being utilized for remote-device control functionality, the corresponding controller, for example, the digital counterpart to controller 216 of FIG. 2, can be configured to monitor communications signal 1200 for the bit(s) of interests, for example, using digital signal monitoring techniques known in the art. Once the controller detects the desired signal(s) it can implement the desired remote-device control functionality, for example, any one or more of the functionalities described herein.

Following is a specific example of method 900 that can be useful especially in a studio setting for turning on and off one or more modeling lighting devices and/or other devices used during a photo-shoot. In this example, the controller (not shown, but which can be virtually identical to controller 216 of FIG. 2 except that it is responsive to camera-body event information carried on a digital status communications signal 1200 of FIG. 12) is configured to detect a camera-body mode event that is available on the hotshoe of the camera body, for example, hotshoe 220 of camera body 204 of FIG. 2, and determine when a user has switched back and forth between a manual mode and an automatic mode five times successively within 5 seconds. In this example, this is the actuation pattern that is "looked for" by the controller at steps 915 and 930 of method 900 of FIG. 9. When the controller has detected this pattern, at the relevant one of steps 920, 935 it generates and transmits to one or more remote devices one or more power state change signals that change the power state of the remote device(s). For example, the controller and remote device(s) may be set up so that at the first detection of the noted pattern at step 915 the controller generates and transmits at step 920 one or more power state change signals that turn-on the remote device(s). This could occur, for example, at the beginning of a photo-shoot when the photographer wants to turn on the remote device(s) after they have been off. Then, at the end of the shoot, the user could create the same noted pattern for detection at step 930. In response to the detection of that pattern, the controller would generate and transmit at step 935 one or more power state change signals to turn off the remote device(s). This can be very useful in that it allows one person to control some or all of the powered device using during a photo-shoot from a single location with minimal effort.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of communicating with a remote lighting device using a camera body having one or more camera body controls, each for controlling one or more camera functions of the camera body, the method comprising:
   detecting a first preset pattern of actuation by a user of at least one first camera body control on the camera body;
   generating a first power level signal in response to said detecting of the first preset pattern of actuation;
   wirelessly communicating the first power level signal to the remote lighting device so as to cause the remote lighting device to operate at a first power level;
   after communicating the first power level signal, detecting a second preset pattern of actuation by a user of at least one second camera body control on the camera body;
   generating a second power level signal in response to said detecting of the second preset pattern of actuation; and
   wirelessly communicating the second power level signal to the remote lighting device so as to cause the remote lighting device to operate at a second power level.

2. A method according to claim 1, wherein said detecting of the first preset pattern includes detecting a first sequential actuation of a particular camera body control on the camera body.

3. A method according to claim 2, wherein said detecting of the first sequential actuation includes detecting a sequential partial-pressing of a shutter release control.

4. A method according to claim 2, wherein said detecting of the second preset pattern includes detecting a second sequential actuation of a particular camera body control on the camera body.

5. A method according to claim 4, wherein said detecting of the first sequential actuation includes detecting a first sequential partial-pressing of a shutter release control and said detecting of the second sequential actuation includes detecting a second sequential partial-pressing of the shutter release button.

6. A method according to claim 1, wherein the lighting device is a wirelessly remote modeling lighting device.

7. A method according to claim 1, wherein the lighting device is an in-scene lighting device.

8. A method according to claim 1, wherein the lighting device is an ambient lighting device.

9. A method according to claim 1, wherein the camera body includes a third camera body control provided to the camera body for controlling camera body functionality, the method further comprising:

in response to said detecting of the first preset pattern of actuation, changing the camera body functionality of the third camera body control to a power adjustment functionality for controlling the remote lighting device; and in response to said detecting of the second preset pattern of actuation, changing the power adjustment control functionality of the third camera body control back to the camera body control functionality.

10. A method according to claim 9, further comprising while the third camera body control has the power adjustment control functionality, detecting user actuation of the third camera body control, wherein said generating a first power level signal includes generating a power adjustment signal in response to said detecting of user actuation of the third camera body control; and wherein said wirelessly communicating the first power level signal includes wirelessly communicating the power adjustment signal so as to cause the remote lighting device to operate in accordance with the power adjustment signal.

11. A method according to claim 10, wherein said detecting of the user actuation of the third camera body control includes detecting a rotating of a rotary control.

12. A method according to claim 11, further including generating a plurality of power adjustment signals in substantial synchronicity with the rotating of a rotary control, wherein said wirelessly communicating the first power level signal includes wireless transmitting the plurality of power adjustment signals in substantial synchronicity with the rotating of the rotary control so as to cause the remote lighting device to continually change power levels.

13. A system for communicating with a remote lighting device using a camera body having one or more camera body controls, each for controlling one or more camera functions of the camera body, the system comprising:

a means for detecting a first preset pattern of actuation by a user of at least one first camera body control on the camera body;

a means for generating a first power level signal in response to said detecting of the first preset pattern of actuation;

a means for wirelessly communicating the first power level signal to the remote lighting device so as to cause the remote lighting device to operate at a first power level;

a means for after communicating the first power level signal, detecting a second preset pattern of actuation by a user of at least one second camera body control on the camera body;

a means for generating a second power level signal in response to said detecting of the second preset pattern of actuation; and a means for wirelessly communicating the second power level signal to the remote lighting device so as to cause the remote lighting device to operate at a second power level.

14. A system according to claim 13, wherein said means for detecting of the first preset pattern includes a means for detecting a first sequential actuation of a particular camera body control on the camera body.

15. A system according to claim 14, wherein said means for detecting of the first sequential actuation includes a means for detecting a sequential partial-pressing of a shutter release control.

16. A system according to claim 14, wherein said means for detecting of the second preset pattern includes a means for detecting a second sequential actuation of a particular camera body control on the camera body.

17. A system according to claim 13, wherein said means for detecting of the first sequential actuation includes a means for detecting a first sequential partial-pressing of a shutter release control and said means for detecting of the second sequential actuation includes a means for detecting a second sequential partial-pressing of the shutter release button.

18. A system according to claim 13, wherein the lighting device is a wirelessly remote modeling lighting device.

19. A system according to claim 13, wherein the lighting device is an in-scene lighting device.

20. A system according to claim 17, wherein the lighting device is an ambient lighting device.

21. A system according to claim 20, wherein the camera body includes a third camera body control provided to the camera body for controlling camera body functionality, the system further comprising:

a means for changing the camera body functionality of the third camera body control, in response to the detecting of the first preset pattern of actuation, to a power adjustment functionality for controlling the remote lighting device; and a means for changing the power adjustment control functionality of the third camera body control, in response to said detecting of the second preset pattern of actuation, back to the camera body control functionality.

22. A system according to claim 20, further comprising a means for detecting user actuation of the third camera body control, while the third camera body control has the power adjustment control functionality, wherein said means for generating a first power level signal includes a means for generating a power adjustment signal in response to said detecting of user actuation of the third camera body control; and wherein said means for wirelessly communicating the first power level signal includes a means for wirelessly communicating the power adjustment signal so as to cause the remote lighting device to operate in accordance with the power adjustment signal.

23. A system according to claim 22, wherein said means for detecting of the user actuation of the third camera body control includes a means for detecting a rotating of a rotary control.

24. A system according to claim 23, further including a means for generating a plurality of power adjustment signals in substantial synchronicity with the rotating of a rotary control, wherein said means for wirelessly communicating the first power level signal includes a means for wireless transmitting the plurality of power adjustment signals in substantial synchronicity with the rotating of the rotary control so as to cause the remote lighting device to continually change power levels.

25. A machine-readable hardware storage medium containing machine-executable instructions for performing a method of communicating with a controlled device using a camera body having one or more camera body controls, each for controlling one or more camera functions of the camera body, said machine-executable instructions comprising:

a set of instructions for detecting a first preset pattern of actuation by a user of at least one first camera body control on the camera body;

a set of instructions for generating a first power level signal in response to said detecting of the first preset pattern of actuation;

a set of instructions for wirelessly communicating the first power level signal to the remote lighting device so as to cause the remote lighting device to operate at a first power level;

a set of instructions for after communicating the first power level signal, detecting a second preset pattern of actuation by a user of at least one second camera body control on the camera body;

a set of instructions for generating a second power level signal in response to said detecting of the second preset pattern of actuation; and a set of instructions for wirelessly communicating the second power level signal to the remote lighting device so as to cause the remote lighting device to operate at a second power level.

* * * * *